(12) United States Patent
Corcoran

(10) Patent No.: US 12,258,104 B2
(45) Date of Patent: *Mar. 25, 2025

(54) WATERCRAFT WITH BATTERY BALLAST SYSTEM

(71) Applicant: John F. Corcoran, Hyannis, MA (US)

(72) Inventor: John F. Corcoran, Hyannis, MA (US)

(73) Assignees: Mary A. Corcoran, Hyannis, MA (US); Ellen T. Corcoran, Hyannis, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/092,602

(22) Filed: Jan. 3, 2023

(65) Prior Publication Data

US 2023/0150619 A1 May 18, 2023

Related U.S. Application Data

(63) Continuation of application No. 17/211,069, filed on Mar. 24, 2021, now Pat. No. 11,572,140.
(Continued)

(51) Int. Cl.
*B63B 43/08* (2006.01)
*B63H 21/17* (2006.01)
*B63H 23/26* (2006.01)

(52) U.S. Cl.
CPC ............. *B63B 43/08* (2013.01); *B63H 21/17* (2013.01); *B63H 23/26* (2013.01)

(58) Field of Classification Search
CPC ......... B63B 43/08; B63B 39/02; B63H 21/17; B63H 23/26; F42B 19/14; F42B 19/16; F42B 19/18
See application file for complete search history.

(56) References Cited

U.S. PATENT DOCUMENTS 4,850,907 A * 7/1989 Mula .................. F01B 3/10
440/23
5,062,242 A 11/1991 Corcoran
(Continued)

FOREIGN PATENT DOCUMENTS

CN 105711782 A * 6/2016 ............ B63C 11/52
CN 108116641 A 6/2018
(Continued)

OTHER PUBLICATIONS

William Burroughs, "Tight BWMS Retrofit Capacity Could Push Ships Into Retirement." Marine Log, Dec. 2019. pp. 31-32.
(Continued)

*Primary Examiner* — Andrew Polay
(74) *Attorney, Agent, or Firm* — Hansen IP Law PLLC

(57) ABSTRACT

A watercraft comprising a battery ballast system is shown and described. The battery ballast system comprises a plurality of carriage assemblies, each comprising a plurality of tiers along the watercraft's height axis, and each being movable along the watercraft's length axis. The batteries sit on movable supports that are movable along the watercraft's width axis. Each tier is loaded to less than 50 percent with batteries and battery supports so that the batteries in each tier can be moved along the ship's width axis relative to the hull in a manner that will affect the ship's list. The carriage assemblies occupy a portion of the length along which they are movable so that they can be moved along the ship's length axis relative to the hull to affect the ship's trim. In certain examples, the ship's potable water system is used to change the watercraft's total amount of ballast by changing the total volume of treated water on board such as by expelling treated water overboard or changing the rate of untreated water being fed to the potable water system.

16 Claims, 9 Drawing Sheets

Related U.S. Application Data

(60) Provisional application No. 63/001,305, filed on Mar. 28, 2020.

(56) References Cited

U.S. PATENT DOCUMENTS

| | | | |
|---|---|---|---|
| 5,860,783 | A | 1/1999 | Corcoran |
| 6,073,569 | A * | 6/2000 | Motsenbocker ....... B63H 21/17 |
| | | | 114/61.12 |
| 6,077,019 | A | 6/2000 | Corcoran |
| 8,793,012 | B2 | 7/2014 | Corcoran |
| 9,511,830 | B2 | 12/2016 | Corcoran |
| 10,000,264 | B2 | 6/2018 | Sheard |
| 10,160,523 | B2 | 12/2018 | Teppig, Jr. et al. |
| 10,435,129 | B1 | 10/2019 | Corcoran |
| 2007/0203623 | A1 | 8/2007 | Saunders et al. |
| 2011/0004367 | A1 | 1/2011 | Saunders et al. |
| 2011/0192333 | A1 | 8/2011 | Lilas et al. |
| 2014/0033961 | A1 | 2/2014 | De |
| 2015/0027125 | A1 | 1/2015 | Raj |
| 2016/0194056 | A1 * | 7/2016 | Chang ...................... B63B 7/08 |
| | | | 114/77 R |
| 2017/0369137 | A1 * | 12/2017 | Smith .................. G05D 1/0875 |
| 2018/0290718 | A1 | 10/2018 | Sheard |
| 2019/0135384 | A1 | 5/2019 | Teppig, Jr. et al. |
| 2020/0078701 | A1 | 3/2020 | Ramandeep et al. |

FOREIGN PATENT DOCUMENTS

| | | |
|---|---|---|
| CN | 109353477 A | 2/2019 |
| JP | 4984591 B2 | 7/2012 |
| KR | 20110085658 A | 7/2011 |
| KR | 1020140014975 A | 2/2014 |
| KR | 1020200061936 A | 11/2018 |
| WO | 2001047769 A1 | 7/2001 |
| WO | 2009026964 A1 | 3/2009 |
| WO | 2015038384 A9 | 9/2014 |
| WO | 2019034032 A1 | 2/2019 |
| WO | 2020036853 A1 | 2/2020 |

OTHER PUBLICATIONS

"Emerging Ballast Water Management Systems", Proceedings of the IMO-WMU Research and Development Forum. Jan. 26-29, 2010. pp. 1-322. WMU Publications, 2010, Sweden.
International Search Report and Written Opinion for PCT/US2021/023877 dated Jul. 12, 2021.
English translation of KR1020200061936 from Questel FAMPAT dated May 26, 2021.
English translation of KR1020140014975 from Questel FAMPAT dated May 22, 2021.
English translation of WO2001047769 from Questel FAMPAT dated May 26, 2021.
English translation of CN109353477A from Total Patent One.
English translation of CN105711782A from Total Patent One.
English translation of CN108116641A from Total Patent One.
English translation of KR20110085658A from Total Patent One.
Extended European Search Report for EP 21781111.6 dated Jul. 23, 2024.
English translation of WO2019034032 from Google Patent.
English translation of JP4984591 from Google Patent.

* cited by examiner

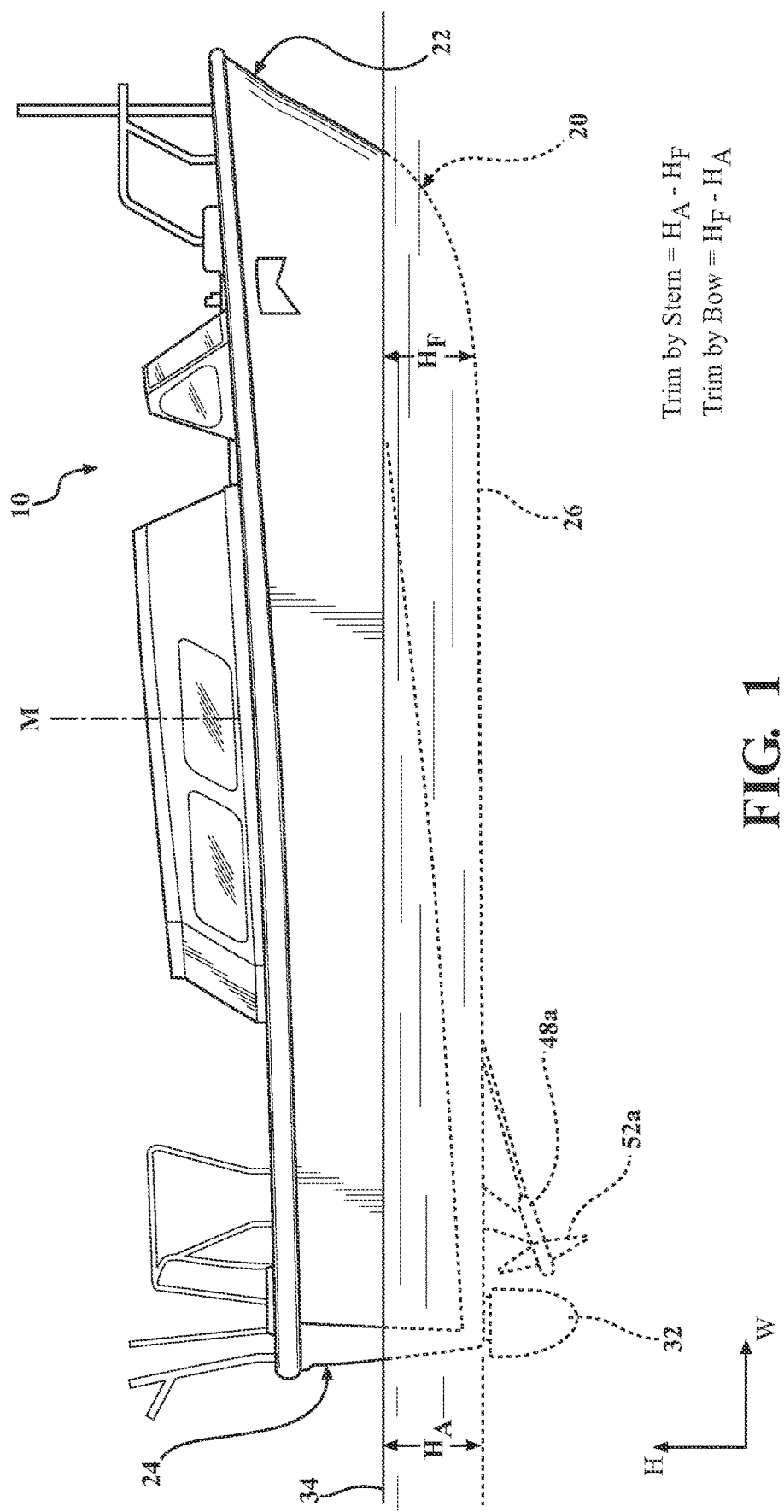

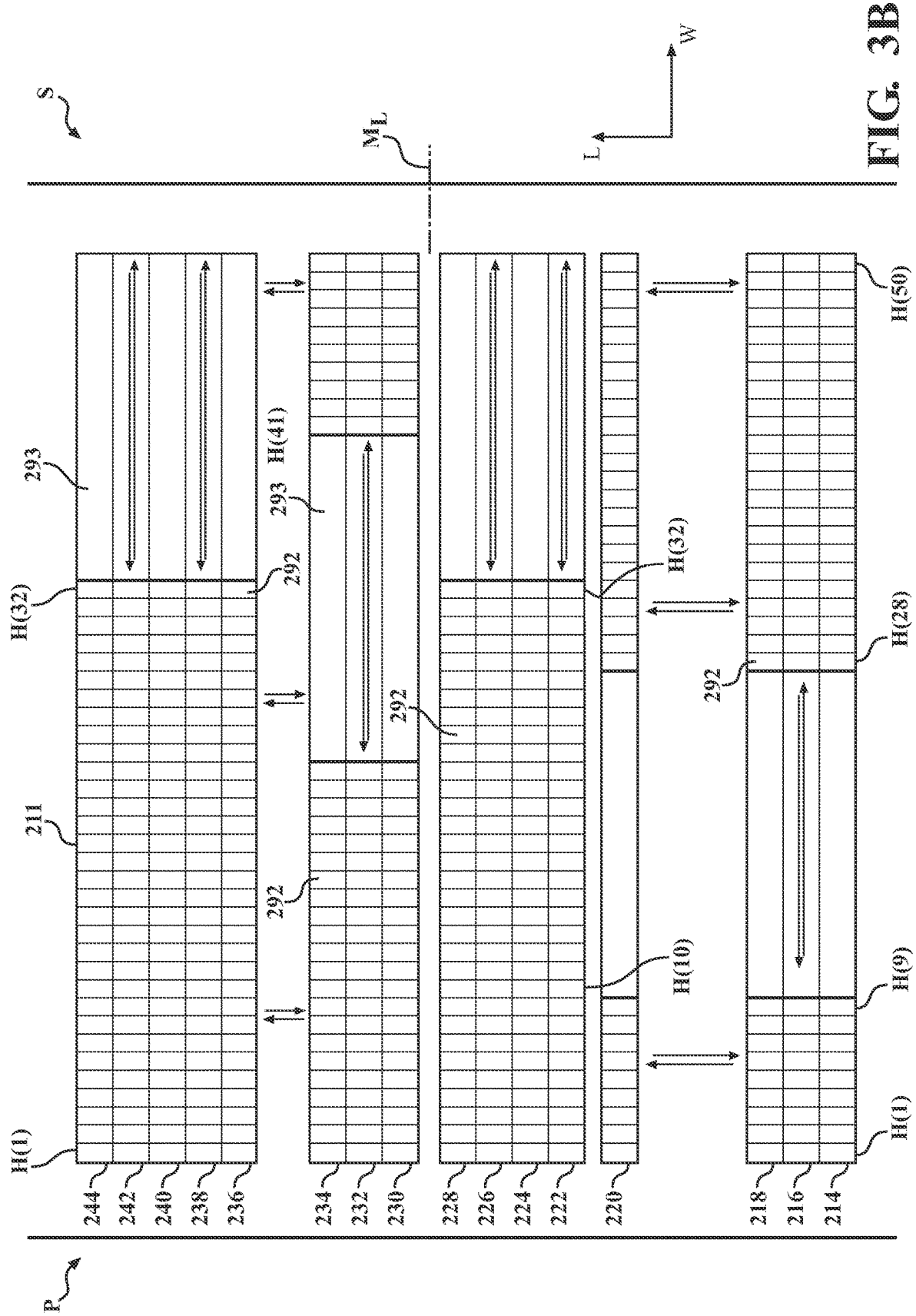

WATERCRAFT WITH BATTERY BALLAST SYSTEM

CROSS REFERENCE TO RELATED APPLICATIONS

This application is a continuation of U.S. patent application Ser. No. 17/211,069, filed on Mar. 24, 2021, which claims the benefit of U.S. Provisional Application No. 63/001,305, filed Mar. 28, 2020, the entirety of each of which is hereby incorporated by reference.

FIELD

This disclosure relates to watercraft ballast systems, and more specifically, watercraft that use arrays of movable batteries as ballast.

DESCRIPTION OF THE RELATED ART

Many watercraft use a form of ballast to enhance stability. The ballast is typically some sort of repositionable weight that can be selectively positioned within the vessel to adjust its trim, list, and/or draft. Ballast is important not only to prevent a vessel from capsizing, but also for the safety and comfort of its passengers and the stability of its cargo. Rough seas or shifting of cargo may disturb the vessel's stability, and the ballast is used to offset their impact on stability.

Water is a common form of ballast since it is readily available. A typical ballast water system comprises a series of tanks in the bottom of the vessel hull as well as strainers, pumps, distribution pipes, treatment systems, and discharge systems. The tanks are often segregated so that ballast water may be selectively admitted or expelled from a vessel in a manner that affects the relative ballast water loading fore and aft of the ship's mid-line along its length axis and/or the relative ballast water loading on the port and starboard sides of the ship's mid-line along its width axis. In addition to adjusting relative loadings, the total amount of ballast water on board may be increased or decreased, which tends to change the ship's draft, i.e., the distance from a point on the keel to the waterline. The term "trim" refers to the relative draft at the bow and the stern. When the draft is greater fore than aft, the ship will have a positive "trim by bow" and a negative "trim by stern." When the draft is greater aft than fore, the ship will have a positive trim by stern and a negative trim by bow.

One significant drawback of ballast water systems is that they are a source of invasive species such as zebra mussels, sea lamprey, and spiny water fleas. Invasive plant species such as Eurasian Milfoil may also be introduced. Various international, national and local laws impact whether and to what extent ballast water may be discharged. The International Convention for the Control and Management of Ships' Ballast Water and Sediments requires that ships meet more stringent invasive species standards, which will require the installation of new ballast water management systems (BWMS) within the next five (5) years. It is anticipated that the standards will be cost-prohibitive in many cases. In addition, it is expected that retrofitting efforts will overwhelm current drydock capacity, forcing many vessels into retirement.

Ships often carry large numbers of batteries used to power instruments and equipment. The batteries constitute discrete units of mass which may, in theory, be selectively positioned within the vessel to maintain its stability. However, a reliable and automatic means of repositioning them has not been proposed. In addition, batteries cannot be added or removed at sea to increase or decrease the ship's total ballast weight. Thus, a need has arisen for a battery ballast system. In addition, some existing vessels have an insufficient amount of available space to accommodate the number of batteries required to provide meaningful ballast. Thus, a need has arisen for a watercraft designed to accommodate a battery ballast system.

SUMMARY

In accordance with a first aspect of the present disclosure, a watercraft is provided which comprises a hull; a propeller operable to propel the watercraft through a body of water; an air motor operative to rotate the propeller; an air storage tank in selective fluid communication with the air motor; an air compressor operable to selectively supply compressed air to the air storage tank; and ballast comprising a plurality of batteries, wherein the batteries in the plurality of batteries are selectively positionable relative to the hull along at least one of a watercraft length axis and a watercraft width axis. In a first embodiment, the batteries are selectively positionable along the watercraft length axis and the watercraft width axis. In the same or other embodiments, the watercraft further comprises a battery ballast system comprising a carriage system and the plurality of batteries, wherein the carriage system comprises a plurality of carriage assemblies, each carriage assembly comprises a plurality of tiers, each tier comprises a pair of tracks, the carriage system further comprising a plurality of battery supports, each battery support engaging a corresponding one of the pairs of tracks and being movable relative to the hull along its corresponding one of the pairs of tracks.

In accordance with a second aspect of the present disclosure, a watercraft is provided which comprises a hull; a propeller operable to propel the watercraft through a body of water; an air motor operative to rotate the propeller; an air compressor operable to supply compressed air to the air motor, wherein the watercraft does not include a fossil fuel engine or a fossil fuel tanks; and ballast comprising a plurality of batteries, wherein the batteries in the plurality of batteries are selectively positionable relative to the hull along at least one of a watercraft length axis and a watercraft width axis. In a first embodiment, the batteries are selectively positionable relative to the hull along the watercraft length axis and the watercraft width axis. In the same or other embodiments, the watercraft further comprises a battery ballast system comprising a carriage system and the plurality of batteries, wherein the carriage system comprises a plurality of carriage assemblies, each carriage assembly comprises a plurality of tiers, each tier comprises a pair of tracks, the carriage system further comprising a plurality of battery supports, each battery support engaging a corresponding one of the pairs of tracks and being movable along its corresponding one of the pairs of tracks relative to the hull.

In accordance with a third aspect of the present disclosure, a watercraft is provided which comprises a hull; a propeller operable to propel the watercraft through a body of water; a battery ballast system comprising a carriage system and a plurality of batteries, wherein the batteries in the plurality of batteries are selectively positionable relative to the hull along a watercraft length axis and a watercraft width axis. In accordance with a first embodiment, the carriage system comprises a plurality of carriage assemblies, each carriage assembly comprises a plurality of tiers, each tier comprises a pair of tracks, the carriage system further comprising a plurality of battery supports, each battery support engaging a corresponding one of the pairs of tracks and being movable relative to the hull along its corresponding one of the pairs of tracks. In the same or other embodiments, the battery supports are moveable along the watercraft width axis relative to one another. In the same or other embodiments, the carriage assemblies are movable along the watercraft length axis relative to the hull.

In accordance with a fourth aspect of the present disclosure, a method of adjusting the trim of a watercraft having a bow and a stern defining a length axis is provided. The method comprises providing a battery ballast system comprising a carriage system and a plurality of batteries, wherein the batteries in the plurality of batteries are selectively positionable relative to the hull along a watercraft length axis and a watercraft width axis; and selectively moving a subset of the plurality of batteries along the length axis relative to the hull.

In accordance with a fifth aspect of the present disclosure, a method of adjusting the list of a watercraft having a hull, a port side and a starboard side defining a width axis is provided. The method comprises providing a battery ballast system comprising a plurality of batteries and a plurality of tiers, wherein each tier comprises a plurality of battery supports that are movable relative to the hull along the width axis; and selectively moving a subset of the plurality of batteries along the width axis.

In accordance with a sixth aspect of the present disclosure, a method of adjusting the draft of a watercraft, the watercraft comprising a potable water system having an untreated water inlet in fluid communication with a desalination unit, and a fresh water tank in fluid communication with the desalination unit is provided. The method comprises adjusting a volume of fresh water in the fresh water tank.

The disclosure will now be described, by way of example, with reference to the accompanying drawings, in which:

BRIEF DESCRIPTION OF THE DRAWINGS

The disclosure will now be described, by way of example, with reference to the accompanying drawings, in which:

FIG. 1 is a side elevational view of a watercraft used to illustrate the determination of a ship's draft and trim;

FIG. 3B is a cross-sectional view of the a watercraft comprising a battery ballast system taken along a direction parallel to the watercraft's height axis.

DETAILED DESCRIPTION

Figure 2A:
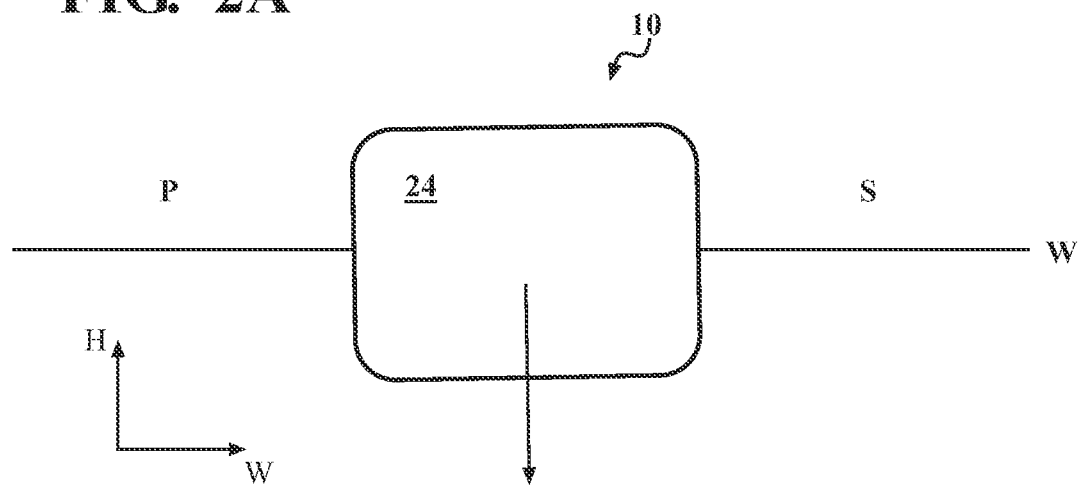
FIG. 2A is a rear schematic view of a watercraft in an upright orientation used to illustrate the determination of a watercraft's list.

The Figures illustrate examples of a watercraft with a battery ballast system. Based on the foregoing, it is to be generally understood that the nomenclature used herein is simply for convenience and the terms used to describe the invention should be given the broadest meaning by one of ordinary skill in the art. Unless otherwise specified, like numerals refer to like components herein.

Referring to FIG. 1, a watercraft 10 is depicted. Watercraft 10 comprises a hull 20 which includes a bow 22 and a stern 24, as well as a keel 26. A distance between bow 22 and stern 24 defines a length axis L of the watercraft. A rudder 32 projects away from the keel 26 and is used to steer the watercraft 10. Watercraft 10 comprises at least one propeller that is operable to propel the watercraft 10 through the water. In FIG. 1 the at least one propeller is propeller 52a and propeller 52b (not shown in FIG. 1). Propeller 52a is spaced apart from the keel 26 and below waterline 34 (when watercraft 10 is in a body of water). A distance along the height axis H from the keel 26 to the waterline 34 defines the watercraft's draft.

As FIG. 1 indicates, watercraft 10 may have a draft that varies along the length axis. This variation between the draft at the bow 22 and stern 24 is characterized as the watercraft's trim. The draft is the distance from a portion of the keel to the waterline in a vertical direction, i.e., perpendicular to the waterline and the surface of the water. The difference between the draft at the bow ($H_F$) and at the stern ($H_A$) is known as the "trim". The "trim by bow" is the difference in feet between the draft at the bow and at the stern as shown in equation (1):

$$\text{Trim by Bow} = H_F - H_A \quad (1)$$

wherein, $H_F$=the draft at the bow (ft.)
$H_A$=the draft at the stern (ft.)

The "trim by stern" is the difference in feet between the draft at the stern and at the bow, as shown in equation (2):

$$\text{Trim by Stern} = H_A - H_F \quad (2)$$

Generally, the convention is to state the trim as a positive number. When $H_A$ is greater than $H_F$, the trim is described as a positive trim by stern, and when $H_A$ is less than $H_F$, the trim is described as a positive trim by bow. When $H_A$ equals $H_F$, the vessel is on an even keel. The trim may be affected by the condition of the body of water, the cargo load, and the ship design. As mentioned previously, ballast is typically adjusted along the length axis of the watercraft 10 to achieve a desired trim.

Figure 2B:
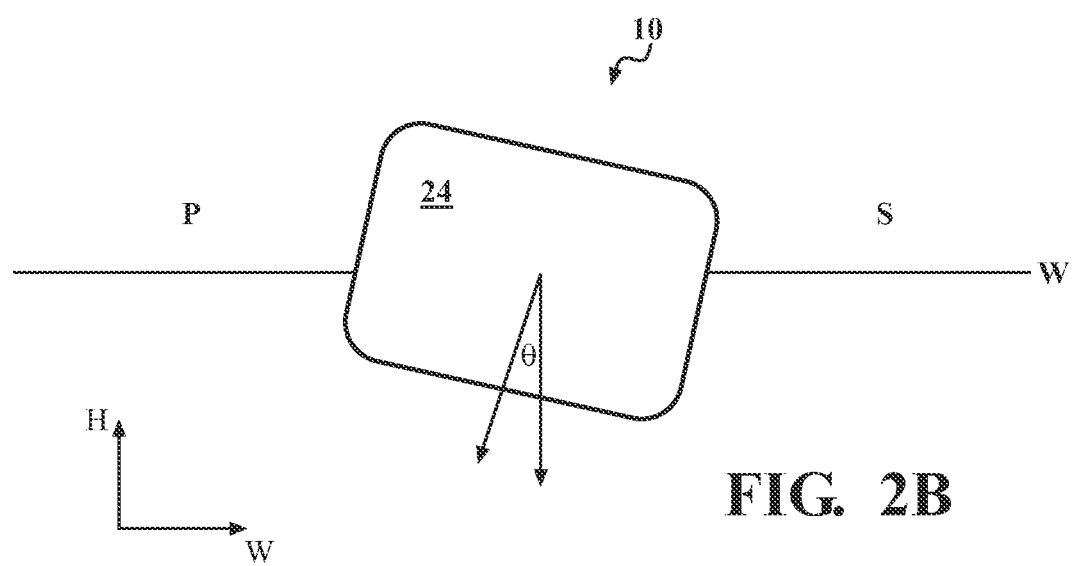
FIG. 2B is a rear schematic view of the watercraft of FIG. 2A in a tilted orientation used to illustrate the determination of the watercraft's list.

FIG. 2A-2B provide a schematic representation of the stern 24 of watercraft 10 used to depict the list of the watercraft 10. In FIG. 2A, the watercraft 10 is upright, and its center of gravity and center of buoyancy are collinear with the vertical axis (i.e., an axis perpendicular to the earth, the surface of the water, and the waterline W). Thus, watercraft 10 has a list angle of zero. In FIG. 2B a disturbance has caused the watercraft 10 to tilt toward the starboard direction, and the center of gravity and center of buoyancy are co-linear with a line that defines a list angle θ with the vertical line in FIG. 2A. As mentioned previously, the ballast may be adjusted along the width axis of watercraft 10 to adjust the list angle θ.

Figure 3A:
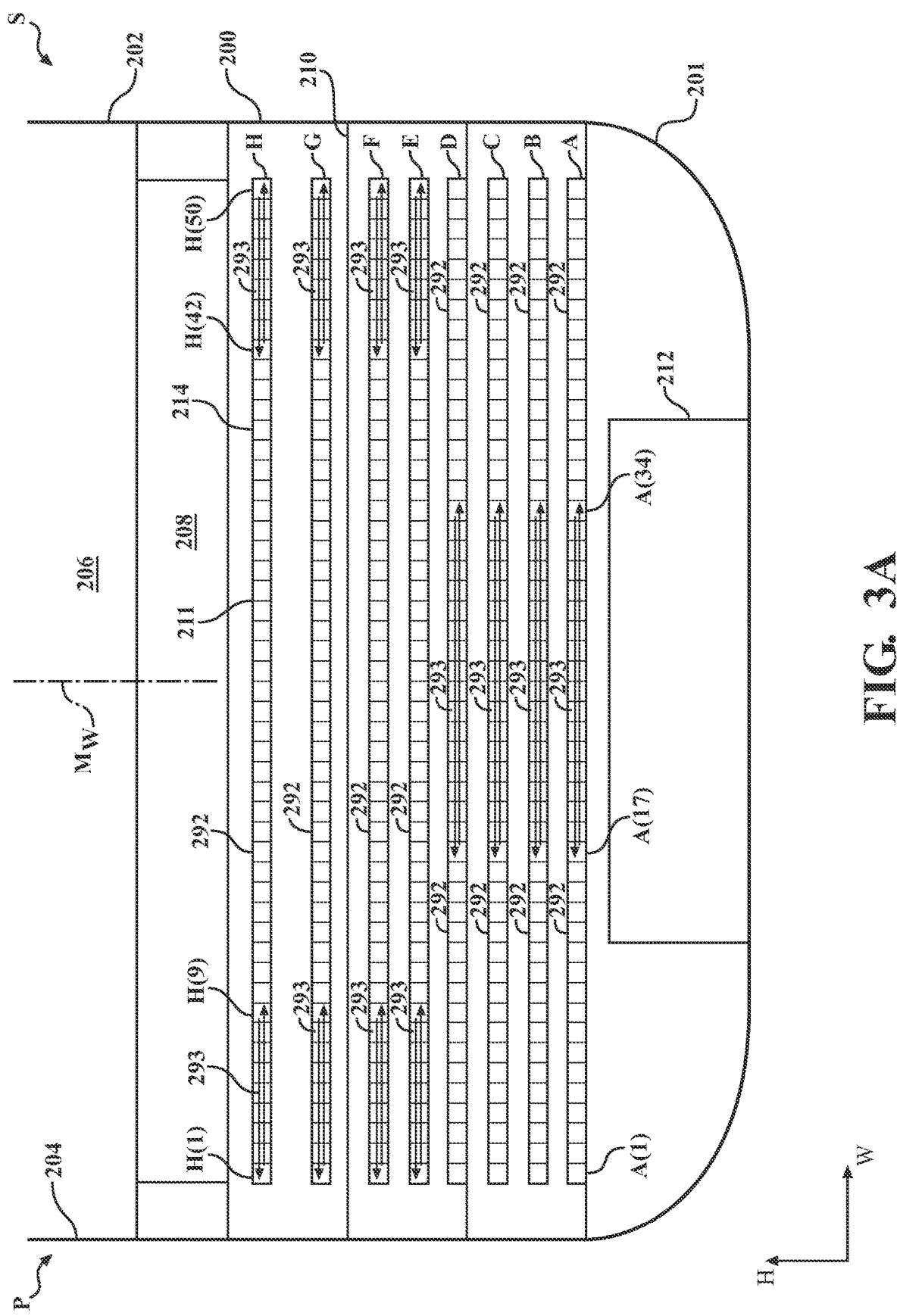
FIG. 3A is a cross-sectional view of a watercraft comprising a battery ballast system taken along a direction parallel to the watercraft's length.

Referring to FIGS. 3A and 3B, a ship 200 is depicted which comprises a hull 201 and a battery ballast system 211. The battery ballast system 211 is preferably located in a lower deck 210 below the main deck (not shown) along the ship's height axis H. Lower deck 210 has a starboard bulkhead 202 and a port bulkhead 204 spaced apart along the ship's width axis. In FIG. 3A battery ballast system 211 is shown below the main deck and cargo hold 206 as well as below a potable water system deck 208 that houses a portion of the ship's potable water system, an example of which is discussed below with reference to FIG. 6A. Purified potable water is located on deck 212.

The battery ballast system 211 comprises a carriage system that includes a plurality of carriage assemblies 214-244 (FIG. 3B). Each carriage assembly 214-244 comprises a plurality of batteries 292. The carriage assemblies 214-244 are selectively movable along the watercraft's length axis to adjust the watercraft's ballast along the length axis. Each carriage assembly 214-244 comprises a plurality of tiers arranged along the watercraft's 10 height axis. Each tier comprises a pair of tracks and a plurality of battery supports, each of which engages and is movable along a corresponding one of the pairs of tracks.

Carriage assembly 214 is depicted schematically in FIG. 3A. Each of the carriage assemblies 214-244 has the same structure in the illustrated embodiments, although different structures may be used. Carriage assembly 214 comprises eight tiers A-H, which are arranged along the watercraft's height axis H. The same tier naming convention applies to the tiers of carriage assemblies 216-244. The tiers A-H are spaced apart along the height axis in FIG. 3A for ease of viewing, but are actually connected to define an integral carriage assembly 214.

Each tier A-H includes fifty slots which are locations that can accommodate a battery 292. The slots are arranged along the watercraft's width axis. The slots 1-50 are fixed positions within the carriage assembly. Different batteries 292 may be repositioned to different slots. The batteries 292 are positioned on battery supports (described below) that move along the tracks of the tier to which the battery belongs and along the ship's width axis. As discussed in greater detail below, the battery supports are generally I-shaped members, the opposite ends of which slidingly engage the rails of the carriage assembly tier to which they belong. In certain examples, each battery and a corresponding battery support (described below) on which the battery is positioned is individually movable along the watercraft's width axis. However, in other examples, individual batteries are grouped together and move together, such as in groups of five, ten, fifteen, or twenty batteries. Grouping batteries in the matter provides somewhat reduced flexibility in positioning the batteries where desired but simplifies the motor assembly required to move the battery supports.

The number of battery supports in a given tier A-H is preferably less than the number of slots 1-50 in the tier. Otherwise, the batteries 292 in that tier could not be repositioned along the width axis to alter the list angle θ. (FIG. 2B). All batteries 292 can be moved along the width axis, either toward or away from the starboard and port bulkheads 202, 204. A subset of batteries 292 can be moved from one side of midship to the other side of midship along the width axis (Mw). The number of batteries in the subset depends on the loading of the slots. In the example of FIG. 3A, 9 of the 32 batteries in each tier can be moved from one side of midship along the width axis to the other.

The number of open slots 293 (slots without battery supports) in a given tier A-H is preferably from about 30% to about 50% of the total slots in the tier, more preferably, from about 35% to about 45% of the total number of slots in the tier, and still more preferably from about 34% to about 38% of the slots in a given tier. In FIG. 3A slots H(10)-H(41) of tier H are occupied in carriage assembly 214, whereas slots H(1)-H(9) and H(42)-H(50) are unoccupied.

As indicated in FIG. 3A, the different tiers A-H may be loaded the same or differently with batteries 292. Tiers A-D have batteries 292 and battery supports in slots 1-16 and 35-50 only, whereas tiers E-H have batteries and battery supports in slots 10-41 only. As an example of how the batteries 292 would be re-positioned to alter the list angle θ, if watercraft 200 had the orientation shown in FIG. 2B for watercraft 10, moving batteries 292 from the starboard side to the port side of the width axis midship line Mw would tend to restore the watercraft 10 to its upright orientation of FIG. 2A.

Referring to FIG. 3B, the upper tier H of each of carriage assemblies 214-244 is shown. The configuration of batteries 292 and slots 1-50 in tier H of carriage assembly 214 differs in FIG. 3B relative to 3A. In FIG. 3B sixteen carriage assemblies 214-244 are shown. However, many more may be provided depending on the ship 200. As the figure indicates, each carriage assembly 214-244 is selectively movable along the length axis of the ship relative to hull 201. As also indicated, the battery 292 loading configurations for the upper tier H of each carriage assembly 214-244 may vary along the ship's length axis. In carriage assemblies 214-218 and 220, slots 1-9 and 28-50 are occupied with batteries 292. In carriage assemblies 222-228 slots 1-32 are occupied. In carriage assemblies 230-234, slots 1-22 and 41-50 are occupied, and in carriage assemblies 236-244 slots 1-32 are occupied.

The numbers of slots, the percentage of open slots per tier, and the number of carriage assemblies are preferably selected based on the battery dimensions and weights and the desired degree of ballast on each side of the location that is midship along the width axis ($M_w$) and midship along the length axis ($M_L$). In certain examples, the distance along the length axis occupied by the carriage assemblies 214-244 is about 60% to about 75% of the maximum available distance along the length axis, preferably about 65% to about 70%, and more preferably from about 66% to about 68%. The distance occupied by the carriage assemblies 214-244 along the length axis is the distance along the length axis occupied by the carriage assemblies 214-244 when they are all placed in abutting engagement with no spaces between them. The maximum available distance is the distance between the maximum fore and aft positions of the two carriages that are closest to the bow and the stern, respectively. In FIG. 3B those carriage assemblies are 214 and 244.

Figure 4:
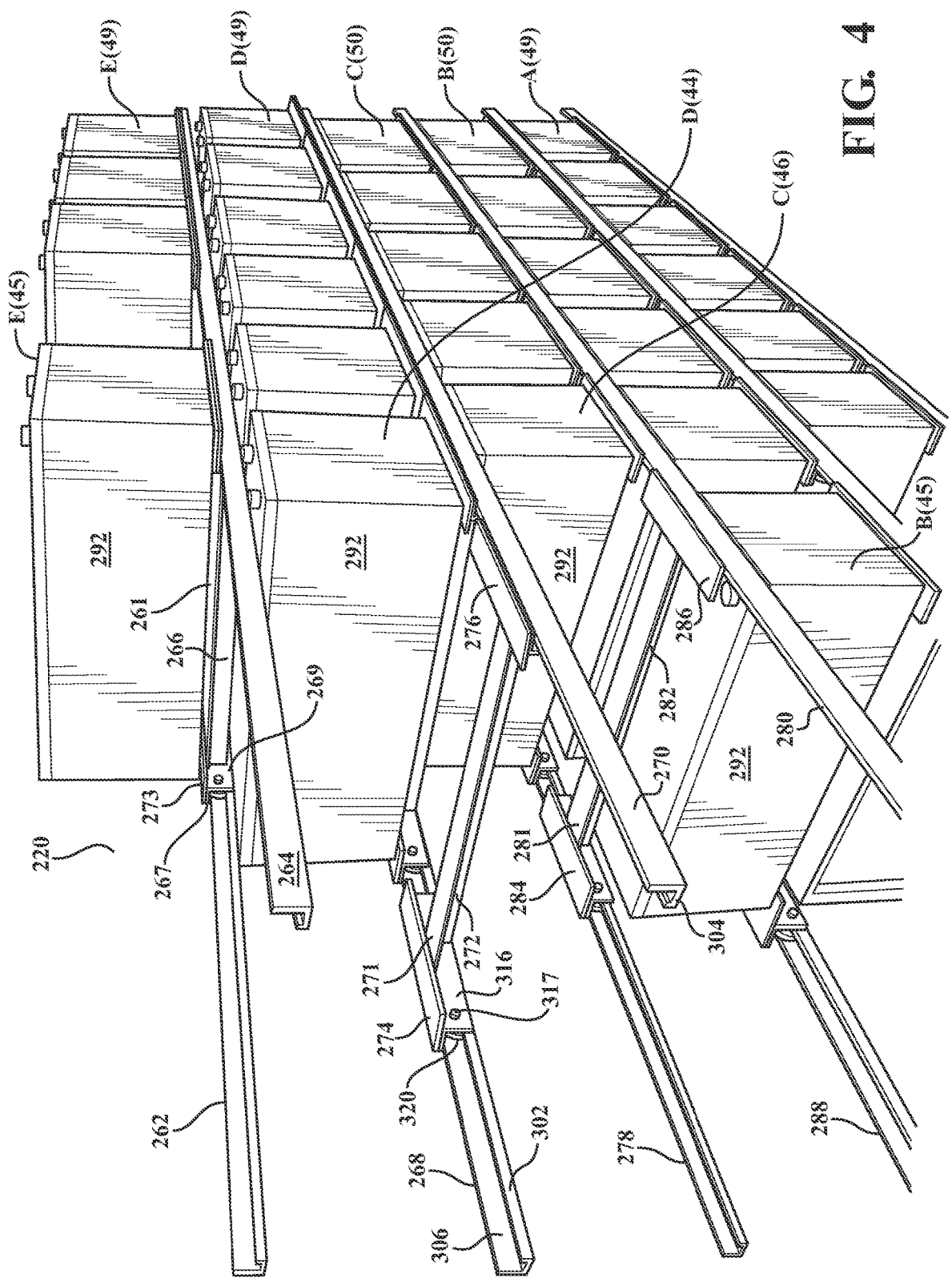
FIG. 4 is a perspective view of a portion of a carriage assembly of the battery ballast system of FIGS. 3A and 3B.

The carriage assemblies 214-244 are structured similarly to one another. One carriage assembly 220 is illustrated in FIG. 4. Only four tiers A-E and a portion of carriage assembly 220 proximate starboard bulkhead 202 are depicted in FIG. 4. Tier E has a parallel set of tracks 262 and 264 which extend along the ship's 200 width axis and are spaced apart from one another along the ship's 200 length axis. Four vertical members (not shown) are placed at the ends of the tracks 262 and 264 and are secured to the tracks 262 and 264 as well as to the tracks of all the other tiers in carriage assembly 220 by suitable mechanical fasteners, welding, or other reliable means. Battery support 261 is one of several battery supports in tier E and may also be referred to as a "carriage seat". Battery support 261 is an I-shaped member that comprises a cross-beam 266 extending between parallel tracks 262 and 264 along the length axis of the ship 200 and end beams 267 and 265 (not shown), which each slidingly engage a respective one of parallel tracks 262 and 264 along the ship's 200 width axis. End beam 267 includes a vertical section 269 and a horizontal section 273. End beam 265 (not shown) is structured and engages the corresponding track 264 in a similar fashion. The details of the engagement between the battery supports and tracks are provided in FIG. 5 and discussed further below.

Batteries 292 each sit on a corresponding battery support. In FIG. 4 tier E slots 45 and 46-49 are occupied. Although battery support 261 is visible, when the support 261 is unoccupied, it would typically be removed to allow a greater degree of movement for the other batteries in the tier.

Tier D comprises parallel tracks 268 and 270 which extend along the ship's width axis and are spaced apart along the ship's 200 length axis. Battery support 271 extends between parallel tracks 268 and 270 along the watercraft's length axis and comprises cross-beam 272 and end beams 274 and 276. Each end beam 274 and 276 slidingly engages a respective one of parallel tracks 268 and 270 along the ship's 200 width axis in the same manner that end beam 267 engages track 262, as described previously. If the support 271 were occupied, the battery 292 would rest on the cross-beam 272 and the end beams 274 and 276.

Tier C comprises parallel tracks 278 and 280 and battery support 281 (along with additional supports not called out). Parallel tracks 278 and 280 extend along the ship's 200 width axis and are spaced apart along the ship's 200 length axis. Battery support 281 is an I-shaped member that comprises a cross-beam 282 which extends between the parallel tracks 278 and 280 along the length axis, and end beams 284 and 286, each of which slidingly engages a respective one of parallel track 278 and 280 along the ship's 200 width axis in the same manner that end beam 267 of battery support 261 engages track 262. In FIG. 4 slots E(50), D(50), and A(50) are not visible. Carriage assembly 220 preferably slidingly engages a pair of rails spaced apart along the ship's width axis and extending along the ship's length axis to move carriage assembly 220 along the ship's length axis relative to hull 201 as would the other carriage assemblies 214-244.

Figure 5:
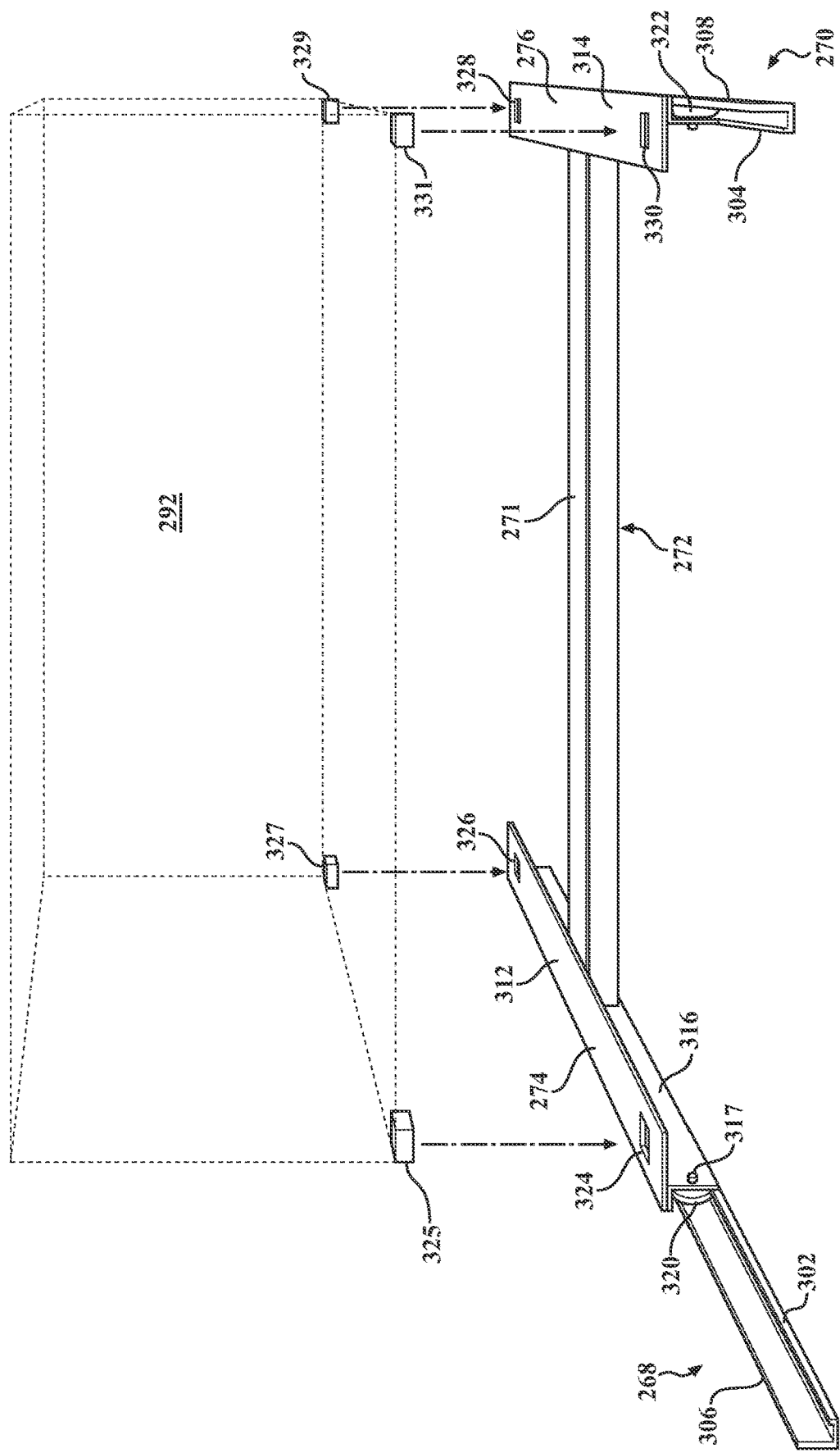
FIG. 5 is an exploded view showing the construction of a battery support attached to the rails of a carriage assembly in the battery ballast system of FIGS. 3A and 3B.

Referring now to FIG. 5, an exemplary battery support for the carriage assemblies 214-244 described herein is illustrated. In FIG. 5 the battery support 271 from carriage assembly 220 of FIG. 4 is illustrated. However, it is understood that in this example, the battery supports for the other carriage assemblies are configured similarly.

Each battery support in each tier A-H is movable transversely to the ship's length axis and along the ship's width axis relative to the ship's hull 201. In the example, battery support 271 includes a cross-beam 272 attached to end beams 274 and 276, as described previously. End beam 274 comprises an upper horizontal section 312 and a lower vertical section 316. Two wheels are rotationally mounted on the lower vertical section 316 and are spaced apart along the ship's 200 width axis direction from one another. Only wheel 320 is visible on lower vertical section 316. Wheel 320 is positioned between the lower vertical section 316 of end beam 274 and an upward extending vertical section 306 of track 268. Track 268 also includes a lower lip 302 that projects toward the other track 270 along the length axis of the ship 200. Wheel 320 rests on the lower lip 302 and rolls along it to allow end member 274 to slidingly engage track 268 along the ship 200 width axis. The other wheel (not shown) attached to the opposite end of the end beam 274 is configured in the same way, End beam 276 also includes an upper horizontal section 314 and a lower vertical section 308. The track 270 is configured as a mirror image or track 268. End beam 276 includes two wheels attached to opposite ends of the lower vertical section. Wheel 322 is shown, but the wheel at the other end of the end beam 276 is not shown. Lower lip 304 functions similarly to lower lip 302. Thus, wheel 322 is positioned between the lower vertical section of the end beam 276 and the upward extending vertical section 308 of track 270 and rides along lower lip 304 of track 270. Thus, end member 276 has two wheels at opposite ends of end member 276 which roll along lower lip 304 of track 270, thereby allowing the end member 276 to slidingly engage the track 270 along the width axis of the ship 200.

In certain examples, each battery support in carriage assemblies 214-244 is motor-driven along its corresponding pair of tracks. A conventional motor assembly is provided and is operable to move each battery support in a given tier A-H of a given carriage assembly 214-244 to a desired slot location. In other examples, the battery supports are connected in groups (such as groups of five, ten, fifteen, or twenty) of battery supports that move together along the ship's 200 width axis relative to hull 201.

As shown in FIG. 5, each battery 292 is positioned and secured to the battery support 271 by, for example, four twist locks 325, 327, 329, and 331 at four corners of the battery 292 that can be interlocked with openings 324, 326, 328, and 330 (not shown in FIG. 4) positioned in end beams 274, 276 of battery support 271 manually or by a remote control. It is to be appreciated that although the battery support 271 has been illustrated with openings 324, 326, 328, 330 for mating the twist locks 325, 327, 329, and 331 of the battery support 271, the battery support 271 can also be provided with twist locks that mate with corresponding openings on the battery 292. Similar twist locks can also be provided either on the battery supports the batteries for interlocking of abutting battery supports or batteries to each other while the vessel is in motion.

In a preferred example of the battery and ballast system 211 described herein, a conventional motor assembly is provided to drive each of the battery supports 271 in each tier A-H along the tracks 268, 270. In addition, a motor assembly control system which comprises a conventional remote control device may also be provided to allow users to operate the ballast system 211 outside the deck on which the battery ballast system 211 is located. The user can thus driveably move batteries 292 to a desired slot in their respective tier. These conventional mechanisms are typically provided in order to achieve proper alignment of the battery supports 271, within each tier, for storage and retrieval operations. The remotely controlled motor assemblies may be mounted, for example, within a cross-beam 272 of each battery support 271.

Thus, in one example, each individual battery support is separately driveable and the remote motor control is provided with a conventional selection device for separately driving each battery support 271 independently of the other battery supports. When ballast adjustments are required in a particular tier, the user can thus separately drive the individual battery supports to an appropriate slot to affect the vessel's list and/or trim. In one example, each battery support is assigned a unique identifier and each slot is assigned a unique identifier so that a remote control may be operated to drive a particular battery support to a particular slot. Of course, not all slots will be accessible to all battery supports in a given tier because of the number of battery supports in the tier. For example, each tier may have 32 battery supports identified as S(1)-S(32). Within the tiers shown in FIGS. 3A and 3B, the S(1) support could be located in any of slots 1-32. The S(2) battery support could be located in any of slots 2-33, etc. In other words, the number of vacant slots in each tier equals the number of different slots that a given battery support 271 may occupy within that tier. However, the particular slots that a given battery may occupy will depend on the battery's location relative to other batteries in the same tier. In other examples, the battery supports may be grouped as described previously. They also may be selectively grouped using suitable mechanisms for joining adjacent battery supports 271 together such as an electromagnetic coupling system, an electromotive coupling system or a mechanical coupling system (e.g., a system of hooks connecting adjacent battery supports 271).

In certain examples, each carriage assembly 214-244 is motor driven along its tracks (not shown) and along the length axis of the vessel. The total length of the available area that is unoccupied by carriage assemblies divided by the length (along the watercraft length axis) of each carriage assembly determines how many carriage assembly locations a given carriage assembly may occupy. For example, if the carriage tracks extend 600 feet along the vessel length axis and each carriage assembly has a length of four (4) feet along the vessel length axis, there will effectively be 150 carriage assembly positions along the vessel's length axis. If 100 carriage assemblies are provided, the total effective length of all carriage assemblies will be 400 feet, leaving 200 feet unoccupied. In that case, each carriage assembly may occupy 50 different carriage assembly locations along the vessel length axis. In other examples, adjacent carriage assemblies may be joined or selectively joined to move as groups along the ship's length axis relative to hull 201.

In certain examples, the total weight (or mass) of the battery ballast system 211 is from about 20 to 30 percent of the ship's 200 dead weight tonnage. "Deadweight tonnage" is a measurement of total contents of a ship including cargo, fuel, crew, passengers, food, and water aside from boiler water. In the same or other examples, each slot of the carriage assembly (including battery supports, but not batteries) is from about 15 lbs to about 25 lbs., preferably from about 17 lbs. to about 23 lbs., and more preferably from about 18 lbs., to about 21 lbs. In the same or other examples, batteries 292 weigh from about 100-200 lbs., preferably from about 120 lbs. to about 180 lbs., and more preferably from about 140 lbs. to about 160 lbs.

Unlike ballast water systems, battery ballast system 211 cannot add or expel batteries 292 while at sea. Thus, while it can be repositioned along the vessel's length and width axes, the total amount of battery ballast on ship 200 cannot be varied while the ship 200 is at sea. In one example, the volume of potable water produced by the vessel's 200 potable water system is varied to effectively provide an additional source of ballast. In certain examples, the ship's potable water system is used to change the watercraft's total amount of ballast by changing the total volume of treated water on board such as by expelling treated water overboard or changing the rate of untreated water being fed to the potable water system.

Figure 6A:
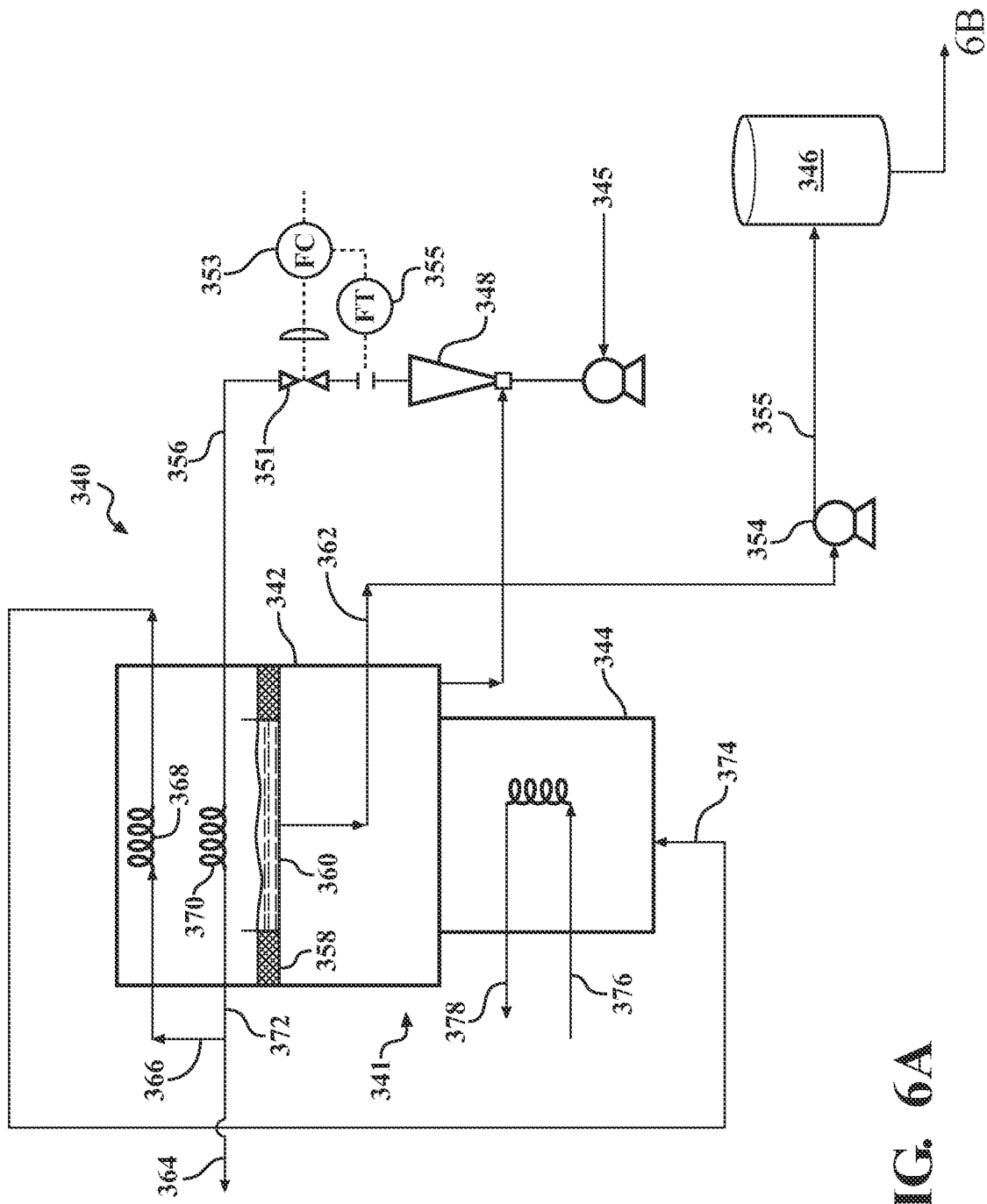
FIG. 6A is a schematic depicting a potable water system used in the watercraft of FIGS. 3A and 3B.

Referring to FIG. 6A, potable water treatment system 340 is depicted. Potable water treatment system 340 is provided to produce fresh, drinkable water from sea water. The potable water treatment system 340 comprises a desalination unit 341 that includes an evaporator 344 and condenser 342. The evaporator 344 creates steam from sea water and removes salt and other non-volatile materials. The steam is then condensed to form potable water.

Sea water brought in via sea water inlet 345 is pumped by ejector pump 348 into condenser cooling water inlet line 356. Coil 370 is provided in the condenser 342 to provide additional surface area for heat transfer from condensing steam to the cooling water. The cooling water leaves condenser in discharge stream 372. A portion of the discharge stream 372 is recycled back to the condenser via recycle stream 366, and the balance of the discharge stream 372 is discharged overboard in overboard discharge line 364.

Figure 6B:
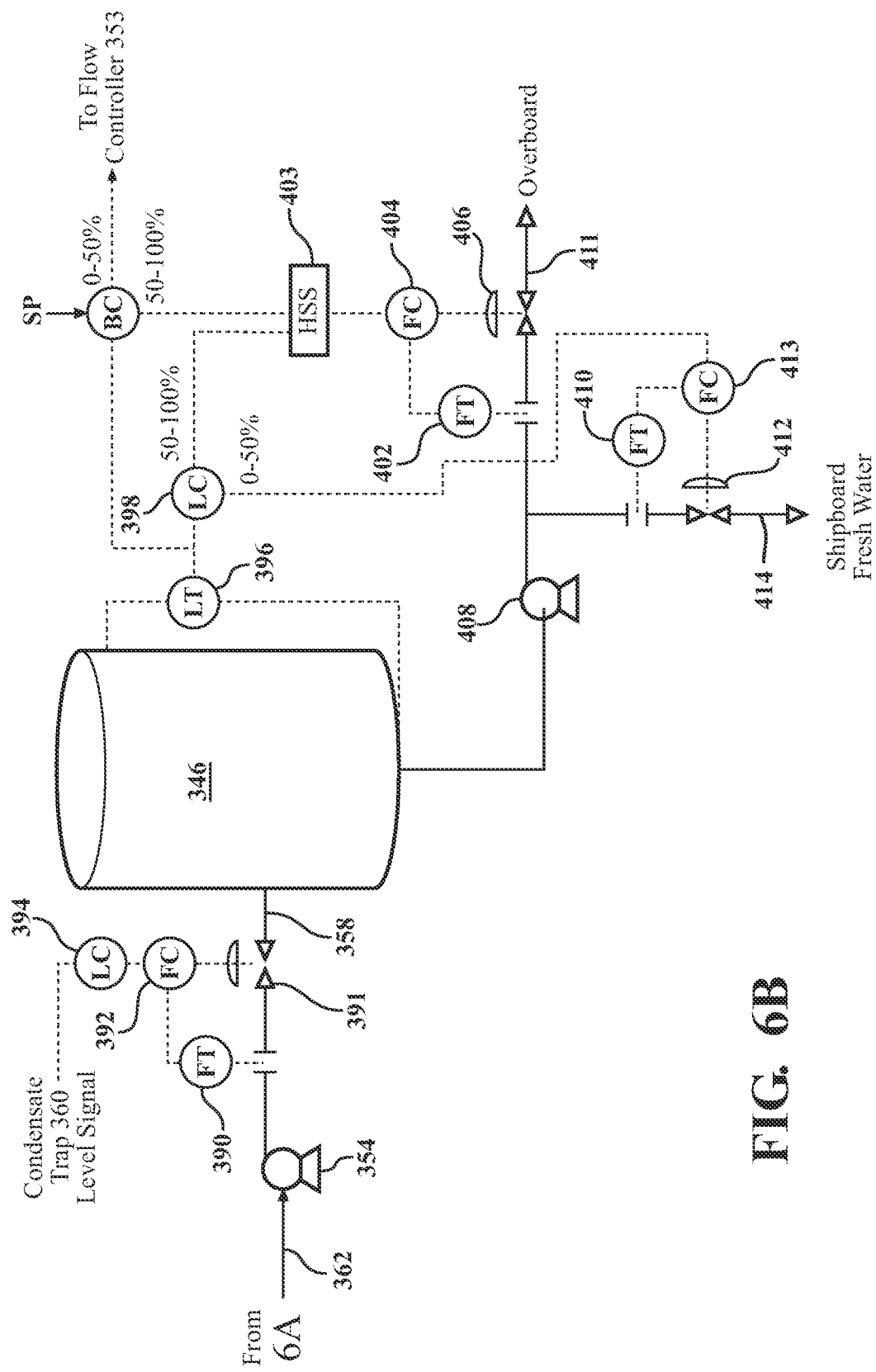
FIG. 6B is a schematic depicting an exemplary control scheme for using the potable water system of FIG. 6A to control the total ballast of the watercraft.

The recycle stream 366 enters secondary cooling coil 368 within condenser 342 and provides secondary cooling to evaporating steam. After leaving the cooling coil 368, the stream is directed to evaporator 344 and becomes evaporator feed steam 374. Engine jacket water provides the heat of evaporation and enters the evaporator 344 via evaporator heating medium inlet stream 376. The evaporator heating medium inlet stream 376 enters the evaporator's heated nest 380 and exits the evaporator 344 via evaporator heating medium outlet steam 378. The heat from the engine jacket water and the pressure at which the evaporator 344 is operated causes the evaporator feed stream water 374 to evaporate within the evaporator 344 and enter the condenser 342. The evaporating water (steam) passes through an annular demister 358 and transfers heat to the cooling water in cooling water coils 370 and 368, causing the steam to condense into condensation trap 360. Condensed water from condensation trap 360 enters treated water pump suction line 362 and is pumped by treated (fresh) water pump 354 to fresh water tank 346. In one example, a level controller may also be provided to control the level on the condensation trap 360 and may be cascaded to a condenser fresh water outlet line 355 flow controller 392 (FIG. 6B). Flow controllers may also be provided on the condenser cooling medium recycle line 366 and/or the evaporator heating medium inlet line 376 or outlet line 378. A variety of different control schemes may be used, but they preferably ensure that the condensate trap 360 does not run dry and that the necessary amount of fresh water is supplied to fresh water tank 346 based on shipboard needs.

In a preferred example, a portion of the volume of fresh water in fresh water tank 346 is used as ballast. In accordance with the example no ballast water tanks are provided that are not fluidly coupled to potable water system 340. As mentioned previously, battery ballast system 211 cannot add or subtract ballast while ship 200 is at sea. If it desirable to increase or decrease the vessel's draft at both the bow and the stern, merely adjusting the locations of batteries 292 will be insufficient. Thus, in certain examples, the potable water treatment system 340 is sized to allow the volume of water in fresh water tank 346 to be varied to provide a desired amount of total ballast variation, i.e., an amount of fresh water that can be expelled from or added to fresh water tank 346 that corresponds to the maximum ballast weight change that is anticipated.

In certain examples, when a decrease in total ballast is required, fresh water from fresh water tank 346 is expelled overboard. The volume of water corresponding to a particular expelled mass of water is shown in equation (3) below:

$$V_E = M_E/\rho \quad (3)$$

where, $V_E$=expelled volume (gal.)
$M_E$=expelled mass (lb$_m$)
$\rho$=density of water (8.35 lb$_m$/gal.)
Based on the tank dimensions, the corresponding change in level can be calculated (assuming a cylindrical geometry) as follows:

$$\Delta L = (0.5348\ V_E)/\pi D^2 \quad (4)$$

where, $V_E$=expelled volume (gal.)
D=Tank diameter (ft.)

For a rectangular prism tank, equation (3) still applies, but instead of equation (4), the following equation is used to calculate level changes:

$$\Delta L = (0.1337 \, V_E)/(a \cdot b) \qquad (5)$$

where, $V_E$=expelled volume (gal.)
a=tank width (ft.)
b=tank length (ft.).

When a change in total ballast is required, it can be effected manually or automatically. In a manual implementation, when a ballast increase is required, flow control valve 406 will first be closed if it is open. If the valve 406 is already closed or if closing it does not provide the desired amount of additional ballast, the flow rate of sea water into the potable water treatment system 340 may be increased, for example, by opening flow control valve 351 on the discharge of pump 352 (FIG. 6A) or by increasing the set point of flow controller 353, which receives a flow measurement signal from flow meter 355.

A variety of suitable control systems may be provided to allow the volume of fresh water in fresh water tank 346 to be varied or expelled based on ballast needs. In one example, a suitable control scheme is provided which is configured to admit or expel a volume of water from tank 346 based on ballast needs while ensuring that the condensate trap 360 does not run dry and while also ensuring that level in tank 346 remains at an acceptable level to operate potable water pump 408 and providing the ship's fresh water usage needs for cooking, bathing, laundry, etc. via shipboard fresh water line 414. In one exemplary control scheme, a flow rate of shipboard fresh water in fresh water line 414 is adjusted to control the level of tank 346, and the overboard discharge line 411 flow rate is adjusted to change the total amount of ship ballast. Fresh water line 414 and overboard discharge line 411 are described in greater detail below.

In one implementation, ballast changes are made by varying the flow rate of treated water that is expelled via overboard line 411. In the same or other implementations, ballast changes are made by varying the flow rate of sea water into the potable water system such as by adjusting the set point of flow controller 353 or opening valve 351 to a desired percentage open.

In a further implementation, desired decreases in ballast are made by increasing the flow rate of expelled water in overboard line 411 and then, if necessary, decreasing the sea water inlet flow rate to potable water treatment system 340. In the same implementation, increases in ballast are made by first decreasing the amount of expelled freshwater in overboard line 411, and if necessary, increasing the sea water inlet flow rate to potable water treatment system 340. These adjustments may be made by manually manipulating valves 406 and 351, by changing the setpoints via their respective flow controllers 404 and 353 or by using a ballast controller such as ballast controller 400, described further below.

In another exemplary control scheme, a ballast controller adjusts the flow rate of overboard discharge line 411 until valve 406 is closed or until the ballast controller is overridden by a level controller that controls the level in tank 346, at which point the ballast controller adjusts the setpoint of flow controller 353 (FIG. 6A) to adjust the sea water inlet flow rate to potable water system 340. Because ballast changes will often be discrete, if a ballast decrease is desired, in this example, the ballast controller will first try to increase the flow rate of ballast water in overboard line 411 and will then try to decrease the sea water inlet flow rate to the potable water treatment system 340. In this example, if a ballast increase is required, the ballast controller will first try to decrease the flow rate of overboard line 411 and will then try to increase the sea water inlet flow rate to potable water treatment system 340 if needed.

Referring to FIG. 6B, in general the level in tank 346 must be maintained to provide sufficient net positive suction head to pump 408, which may constrain the extent to which opening or closing valve 406 can be used to effect a desired ballast change. In FIG. 6B an exemplary control system is provided which addresses both the level control of tank 346 and ballast control. The depicted control scheme controls the ship's total ballast load by adjusting the flow rate of expelled water in overboard line 411. A desired change in total ballast may be effected in a desired time period and converted to an overboard discharge line 411 flow rate as follows:

$$F_{411} = (W_E/\rho)/\Delta t \qquad (6)$$

$F_{411}$=flow rate in line 411 (gal/hour)
$W_E$=Total desired change in ballast (lbs.)
$\rho$=density of water (8.35 lb./gal.)
$\Delta t$=time interval for changing ballast (hours).

Pump 408 pumps fresh, potable water from tank 346 to overboard discharge line 411 and shipboard fresh water line 414. Overboard discharge line 411 directs fresh water from tank 346 overboard and is used to adjust the total amount of ballast by expelling fresh water overboard when a ballast reduction is needed or throttling back on the amount of water sent overboard when an increase is needed.

The overboard discharge line 411 flow rate is controlled by flow controller 404 which adjusts control valve 406 based on a flow rate measured by flow meter 402. Shipboard fresh water line 414 routes fresh water to showers, bathrooms, laundry, kitchens, and any other areas requiring fresh water. The flow rate of fresh water in shipboard fresh water line 414 is controlled by flow controller 413 which adjusts control valve 412 based on the flow rate measured by shipboard fresh water flow meter 410. Although not shown, a recycle line may be provided downstream of control valve 412 so that fresh, potable water not demanded by shipboard users can be recycled back to the tank 346 inlet line 355.

A ballast controller 400 is provided and adjusts the overboard discharge line 411 flow rate by resetting the set-point of flow controller 404 to change the total amount of ship ballast in accordance with equations (3) and (4). As indicated in FIG. 6, the ballast controller 400 receives a level indication from level transmitter 396 and uses the level indication to determine the current volume and weight of fresh water in tank 346. Ballast controller 400 receives a user-entered set point that corresponds to a change in the amount of ballast, or a total amount of ballast in tank 346 (the ballast provided by batteries 292 can only be shifted in the vessel and cannot be increased or decreased while at sea), and a time interval during which the ballast change is to be made. If a total ballast set point is entered, ballast controller 400 would calculate the required ballast change to achieve that set point. In either case the ballast controller 400 includes an algorithm that converts a desired change in total ballast weight and a user-entered time frame for making the change into a flow rate of overboard stream 411 in accordance with equation (6). The ballast controller 400 adjusts the set point of flow controller 404 to the determined set-point to direct fresh water overboard via overboard discharge line 411 until the desired amount of total ballast is achieved or until the desired change in ballast is achieved, at which point the ballast controller will re-set the flow controller 404 set-point to zero. The ballast controller 400 may also ramp the setpoint of flow controller 404 gradually to effect a smoother change in ballast.

A level controller 398 receives a level indication signal from tank 346 level transmitter 396 and resets the set point of flow controller 413 to maintain a desired level of fresh water in tank 346. During normal, steady-state operation the overboard discharge line control valve 406 will preferably remain closed to avoid wasting purified water. Thus, level controller 398 will typically adjust the flow rate of shipboard fresh water line 414 by adjusting the set point of flow controller 413 to maintain the desired level in fresh water tank 346. However, if control valve 412 is fully open and the level in tank 346 continues to rise, level controller 398 will preferably increase the set point of discharge line flow controller 404 to direct fresh water overboard until the tank 346 level reaches it set point. Alternatively or additionally, the level controller 398 may first reset flow controller 353 (FIG. 6A) before resetting the setpoint of flow controller 404 to reduce the amount of seawater coming into the potable water treatment system 340 to stop the level in tank 346 from increasing. The flow of fresh water into tank 346 is controlled by flow controller 392 which adjusts control valve 391 based on the flow rate measured by inlet flow meter 390. Flow controller 392 is re-set by level controller 394 which controls the level of condensate trap 360. A level indicator would be provided on condensate trap 360 but is not shown in FIG. 6A. As the setpoint of flow controller 353 changes, the level in condensate trap 360 will change, causing condensate tray level controller 394 to adjust the inlet flow rate setpoint of flow controller 392 to stabilize the tank 346 level.

In implementations where level controller 398 will override the ballast controller 400 and adjust the set point of flow controller 404 to control the tank 346 level, a high signal selector 403 is provided and selects the higher output signal from among the level controller 398 and the ballast controller 400. It is preferable that this override function occur only after the shipboard fresh water flow control valve 412 is fully open. Thus, level controller 398 is preferably configured as a split range controller such that for a first part of its output range, say from 0 to 50 percent, it adjusts the shipboard fresh water line 414 flow controller 413 set point and for a second part of its output range, say, from greater than 50 percent to 100 percent, it sends an output signal to the high signal selector 403 to adjust the set point of overboard discharge line 411 flow controller 404 as needed. As suggested above, a three way-split range may be used wherein the level controller opens valve 412 from 0-33 percent, closes valve 351 (FIG. 6A) from 33-66 percent, and then opens valve 406 from 67 to 100 percent of the level controller 398 output signal. The valve adjustments may be directly made or by re-setting the setpoints of flow controllers 353, 413, and 404.

The controllers shown in FIG. 6B may be implemented in software or hardware and may be digital or analog. Appropriate transducers would also be provided to convert electrical signals to pneumatic signals and vice-versa if needed. In one example, the set point of ballast controller 400 is adjusted manually by ship personnel to achieve the desired total amount of ballast on board. However, if a draft measurement device or draft estimating technique is used, an advanced ballast control scheme may also be provided which adjusts the set point of the ballast controller 400 automatically. For example, an advanced control scheme may include a draft controller that allows a user to input a set point for the total amount of draft at one location along the hull or the average of the draft and multiple locations and then re-set the ballast controller set point as needed to achieve the desired draft.

In one example of a watercraft with a battery ballast system, the watercraft is devoid of water ballast tanks other than those fresh water tanks that comprise part of the ship's potable water system. In many existing watercraft, the hull volume consumed by ballast water tanks would leave insufficient room for a battery ballast system with enough batteries to make meaningful ballast adjustments. Thus, in some cases it is preferable that the watercraft 10 be devoid of water ballast tanks, except to the extent such tanks serve the dual purpose of retaining treated, potable water for shipboard use as is the case with tank 346. In other words, in such cases it is preferable if watercraft 10 is devoid of ballast water tanks that are not fluidly coupled to a fresh, potable water system 340.

In accordance with another example, a water craft is provided with a battery ballast system of the type described herein in which the watercraft is devoid of fossil fuel tanks and fossil fuel engines. Fossil fuel tanks and engines. typically consume a significant amount of shipboard volume and which make it difficult to include a battery ballast system of sufficient size to make meaningful ballast adjustments. In accordance with a further example, a watercraft is provided which comprises a hull, a propeller operable to propel the watercraft through a body of water, an air motor operative to rotate the propeller, an air storage tank in selective fluid communication with the air motor, an air compressor operable to selectively supply compressed air to the air storage tank, and a ballast comprising a plurality of batteries, wherein the batteries in the plurality of batteries are selectively positionable along at least one of a vessel length axis and a watercraft width axis. In one implementation of the further example, the watercraft is devoid of fossil fuel and fossil fuel engines. In accordance with the same or other examples, the watercraft includes a potable water system, including, for example, potable water system 340 type depicted in FIGS. 6A-B.

Figure 7:
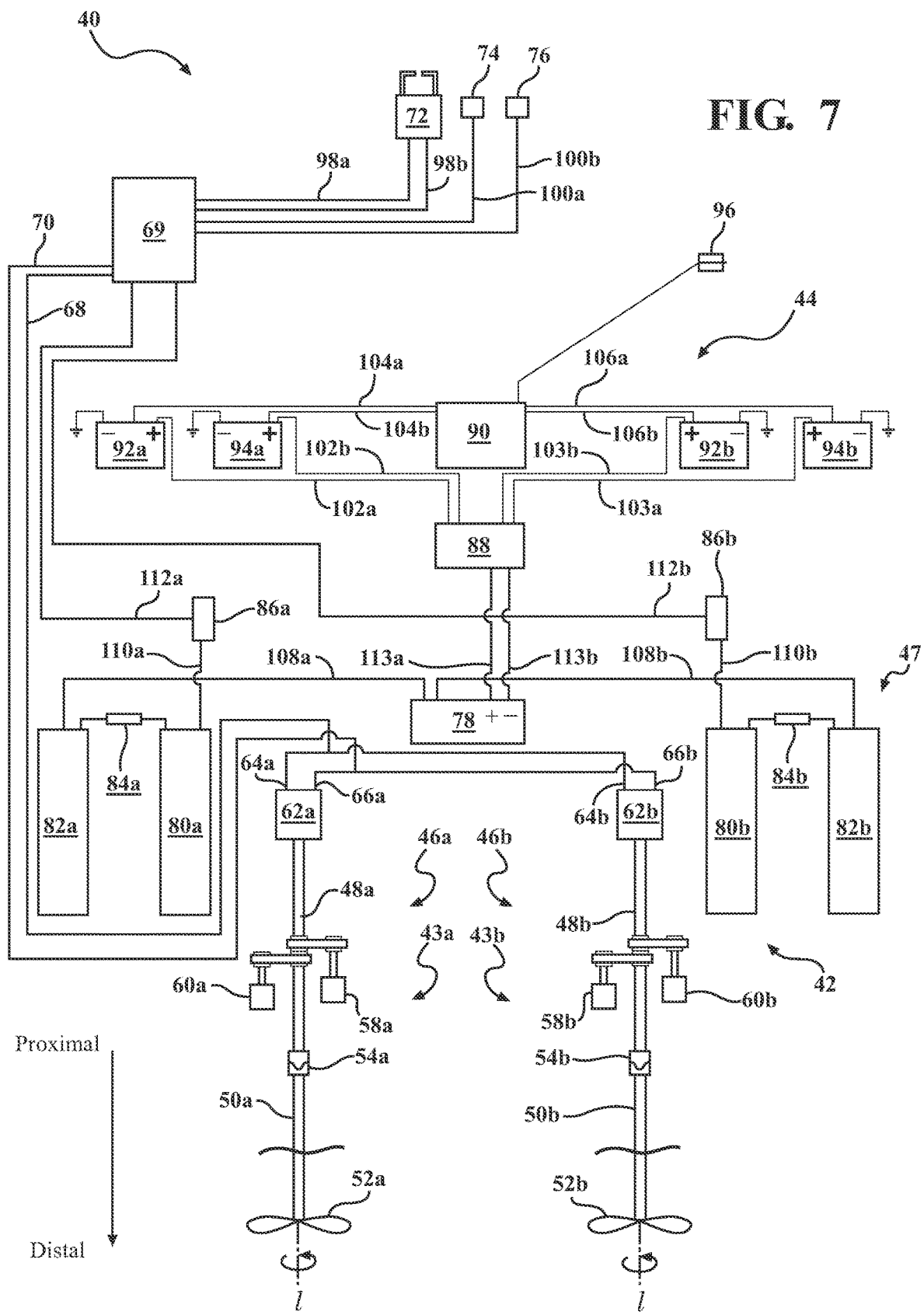
FIG. 7 is an air and electric propulsion system for a watercraft that has no fossil fuel engines or fossil fuel tanks which is suitable for use in a watercraft with a battery ballast system.

Referring to FIG. 7 an air and electric propulsion system 40 useful for use with a watercraft that includes a battery ballast system of the type described herein is provided. The air and electric propulsion system of FIG. 7 is sized for a smaller vessel such as watercraft 10 of FIG. 1. However, the size and/or number of components may be scaled up as needed depending on the size and weight of the vessel. A vessel comprising an air and electric propulsion system and a battery ballast system will be described with reference to watercraft 10 of FIG. 1 and air and propulsion system 40 of FIG. 7, but it should be understood that the watercraft 10 and air and electric propulsion system 40 can be scaled accordingly to accommodate the battery ballast system 211 of ship 200 and that a ship 200 with a battery ballast system of the type described herein and having the air and electric propulsion system 40 of FIG. 7, scaled as appropriate to the size of ship 200, is expressly contemplated.

Propeller 52a is operatively connected to a proximal propeller shaft section 48a which rotates about its lengthwise axis / to rotate propeller 52a within the body of water. The rotation of propeller 52a within the water propels the watercraft 10 in a direction defined by the direction of rotation of propeller 52a, the geometry of the propeller blades, and the orientation of rudder 32.

In this embodiment, watercraft 10 is not powered by a fossil fuel engine and does not include a fossil fuel engine or fossil fuel tanks. Instead, an air motor is provided which is operative to rotate at least one propeller. Referring to FIG.

7, air propulsion system 40 is provided which includes a propeller train 42, an air supply system 47 and a rechargeable battery system 44. A control system is also provided. Air supply system 47 includes at least one compressed air storage tank which is in selective fluid communication with the at least one air motor as well as at least one compressor that is operable to selectively supply compressed air to the at least one air storage tank.

In FIG. 7 the at least one propeller used to propel watercraft 10 through the water comprises two propellers 52a and 52b. Propeller train 42 comprises two parallel propeller systems 43a and 43b. Each propeller system 43a and 43b further comprises a respective propeller shaft assembly 46a and 46b and respective propeller 52a and 52b. Propeller shaft assembly 46a is a multi-segment shaft that comprises a proximal propeller shaft section 48a and a distal propeller shaft section 50a. The proximal propeller shaft section 48a and distal propeller shaft section 50b are connected by a coupling 54a. The proximal end of the propeller shaft assembly 46a is defined by the proximal end of the proximal propeller shaft section 48a and is connected to air motor 62a. The distal end of propeller shaft assembly 46a is defined by the distal end of distal propeller shaft section 50a and is connected to propeller 52a. Similarly, propeller shaft assembly 46b is a multi-segment shaft that comprises a proximal propeller shaft section 48b and a distal propeller shaft section 50b. The proximal propeller shaft section 48b and distal propeller shaft section 50b are connected by a coupling 54b. The proximal end of the propeller shaft assembly 46b is defined by the proximal end of the proximal propeller shaft section 48b and is connected to air motor 62b. The distal end of propeller shaft assembly 46b is defined by the distal end of distal section 50b and is connected to propeller 52b. Each propeller shaft assembly 46a and 46b has a length along a length axis l. When its respective air motor 62a or 62b is activated, each shaft assembly 46a and 46b rotates about its respective length axis *l* as indicated by the curved arrows. The shaft rotation causes each respective propeller 52a and 52b to rotate about its length axis l and move the watercraft 10 through the water.

As mentioned above, air motors 62a and 62b are operable to rotate their respective propeller shaft assembly 46a or 46b and their respective propeller 52a or 52b. Air motors take compressed air and allow it to expand to do mechanical work. Air motors may be linear or rotary depending on the type of mechanical work required. In the case of air motors 62a and 62b, rotary air motors are preferred. The specific rotational frequency of the propeller and horsepower will depend on the weight of the watercraft 10 and the desired speed of travel. In one example, a rotary air motor is used. Suitable, commercially-available, rotary air motors include the 1UP-NRV-15 rotary air motor provided by Gast Manufacturing, Inc. of Benton Harbor, Mich. This motor provides 0.45HP and a torque of 5.25 in-lb at a maximum (no load) rotational speed of 6000 RPM. It also provides a speed of 500 RPM at a maximum torque of 6.0 lb-in. The motor also has a maximum air consumption of 27 cubic feet per minute. The shaft diameter is ⅜ inches, and the air inlet port size is ⅛" NPT. It is rated for a maximum pressure of 80 psig. In the case of ship 200, suitable air motors would include Ingersoll Rand KK5B Piston Air Motors which provide at least 29-30 HP and a torque of about 65 $lb_f$-ft at a maximum rotational speed of about 1400 rpm. The motors have a maximum air consumption of about 800-850 standard cubic feet per minute.

The air used to run the air motors 62a and 62b is provided by air supply system 47. Air supply system 47 comprises air compressor 78 and a plurality of in-line air-storage tanks 80a, 82a, 80b, and 82b. The term "in-line" refers to the fact that each pair of storage tanks (80a/82a and 80b/82b) is in the flow path from the compressor 78 to the air motors 62a and 62b. The pairs of storage tanks—80a/82a on the one hand and 80b/82b on the other hand—are in parallel with respect to one another, but are each in the flow path from a compressor discharge line (108a and 108b, respectively) to the air motors 62a and 62b. Put differently, the air storage tanks 80a, 82a, 80b, 82b do not supply air motors 62a and 62b in parallel with the compressor 78. One or more auxiliary air compressors (not shown) may also be provided to provide supplemental air and ensure that the air motors 62a and 62b have sufficient air flow rates while at the same time ensuring that the air-storage tanks 80a, 82a, 80b, and 82b can be refilled after reaching a desired state of depletion (e.g., a threshold lower pressure limit).

The air compressor 78 discharges to and is in fluid communication with parallel slave air storage tanks 82a and 82b via compressor discharge lines 108a and 108b. Each slave air storage tank 82a and 82b is fluidly coupled to and in fluid communication with a respective master air storage tank 80a and 80b by a respective pressure drop valve 84a and 84b. The pressure drop valves 84a and 84b ensure that the slave air storage tanks 82a and 82b operate at a higher pressure than their corresponding master air storage tanks 80a and 80b, ensuring that air flows from the slave air storage tanks 82a and 82b to their corresponding master air storage tanks 80a and 80b but not in reverse, such as when the slave air storage tanks 82a and 82b are being refilled. The extra pressure drop forces the compressor 78 to run at a higher discharge pressure and lower flow rate than it otherwise would, which prevents oversupplying air to the air motors 62a and 62b. The pressure drop valves 84a and 84b can be control valves, pressure regulators, check valves, etc. However, in certain examples they are not automatically manipulable to achieve a desired pressure, but rather, just provide a source of pressure drop in the system and adjust the operation of the compressor to a higher discharge pressure regime. In certain examples, the pressure drop across each pressure drop valve is from about 1000 psig to about 4000 psig, preferably from about 1500 psig to about 3500 psig, still more preferably from about 2000 psig to about 3000 psig, and still more preferably from about 2400 psig to about 2600 psig.

In preferred examples, the air compressor 78 is run periodically to fill the slave air storage tanks 82a and 82b until their respective pressures reach a desired maximum pressure ($P_{max}$). Filling slave air storage tanks 82a and 82b will also cause master air storage tanks 80a and 80b to fill with air. Such periodic refilling operations are carried out when the pressure in the slave air storage tanks 82a and 82b reaches a predefined lower limit ($P_{min}$). A low pressure switch may be installed on the slave air storage tanks 82a and 82b to determine when the predefined lower pressure limit $P_{min}$ has been reached. Alternatively, hardware or firmware in the control unit 69 may use pressure signals provided from pressure sensors in slave air storage tanks 82a and 82b to determine if the pressures have fallen below $P_{min}$. Among other benefits, periodic (as opposed to continuous) operation of the compressor 78 allows watercraft 10 to run more quietly for long stretches of time (e.g., when the compressor is off). In certain examples, $P_{min}$ is no less than about 1500 psig, preferably not less than about 1700 psig, and more preferably not less than about 1900 psig. In the same or other examples, $P_{min}$ is no more than about 2500 psig, preferably not less than about 2200 psig, and more preferably not less than about 2100 psig.

The in-line slave air storage tanks 82a and 82b are preferably maintained at an operating pressure that is above a first specified threshold value, which is a pre-defined lower limit ($P_{min}$) and below a second specified threshold value, which is a pre-defined upper limit ($P_{max}$). The predefined lower limit $P_{min}$ is preferably high enough to ensure that a desired air flow rate to the air motors 62a and 62b can be maintained at a desired air inlet pressure at the air motors 62a and 62b. Rotary air motors 62a and 62b have characteristic curves that relate the speed of rotation of the motor to the air motor inlet pressure and volumetric flow rate. The in-line air storage tanks 80a/80b and 82a/82b ensure that the desired combination of volumetric air flow rate and air motor inlet pressure can be maintained so that the desired speed of propeller rotation can be achieved. Also, the tanks 80a/80b and 82a/82b are preferably pre-filled to the maximum desired tank pressure ($P_{max}$) before a trip. As a result, the compressor 78 may run only periodically. However, when compressor 78 is running, it is preferred that the compressor discharge flow rate (mass of air) exceeds the rate of consumption by air motors 62a and 62b so that the tanks 80a, 80b and 82a, 82b are replenished. Nevertheless, even during refilling operations, the air motors 62a and 62b may periodically consume more air than the compressor 78 provides as long as on average the air motors 62a and 62b consume less air than is being provided by compressor 78. Thus, the in-line air storage tanks 80a, 80b, 82a, 82b provide greater flexibility in adjusting the speed of the boat by providing surge volumes and reserve volumes of air.

In certain examples, the desired maximum slave tank 82a, 82b air pressure $P_{max}$ is at least about 3000 psig, preferably at least about 4000 psig, and more preferably at least about 4200 psig. $P_{max}$ is preferably no greater than about 6000 psig, preferably no greater than about 5000 psig, and more preferably not greater than about 4600 psig. In the same or other examples, the volume of each slave tank 82a, 82b and master tank 80a and 80b is at least about 350 cubic feet, preferably at least about 380 cubic feet, and more preferably at least about 440 cubic feet, and the volume is no more than about 530 cubic feet, preferably no more than about 500 cubic feet, and more preferably no more than about 450 cubic feet. One exemplary type of air storage tank useful as master tanks 80a, 80b and slave tanks 82a, 82b is the NUVT4500 storage tank supplied by Nuvair of Oxnard, Calif. The tank has a maximum service pressure of 4500 psig, and an internal storage volume of 437 cubic feet. In one example where the watercraft is a ship 200, the volume of each slave tank 82a, 82b and master tank 80a and 80b is sized to provide the desired maximum ship speed at the maximum expected ship weight based on the weight of the ship, the selected air motors, and the maximum expected cargo load, as well as based on any non-cargo items that affect the ship's weight.

The air compressor 78 takes air from the atmosphere and compresses it to a pressure sufficient to supply the master and slave tanks 80a/80b and 82a/82b until the slave air storage tanks 82a and 82b reach their desired maximum pressure ($P_{max}$) during a refilling operation. A high pressure switch may be provided to determine when $P_{max}$ has been reached. The switch may be a hardware switch installed on each slave air storage tank 82a and 82b or a software or firmware switch in a controller within power distribution panel 88 which receives pressure sensor signals from sensors installed on the slave air storage tanks 82a, 82b. In either configuration, the controller uses an input signal or signals to determine whether to turn off the compressor 78 motor. In the case of multiple slave air storage tanks 82a, 82b, the compressor 78 may be turned off when either slave tank 82a, 82b reaches $P_{max}$. Alternatively, the compressor 78 may remain on until both slave air storage tanks 82a and 82b reach $P_{max}$. However, the former approach is preferred as it prevents overfilling the slave air storage tanks 82a, 82b if one of the pressure sensors or switches fails. Suitable commercially available air compressors include the Bauer Model No. 100 air compressor which has a maximum air discharge pressure of about 5000 psig. In the case of ship 200, suitable air compressors would preferably be selected based on the maximum desired motor power.

Compressor 78 discharges compressed air to slave air storage tank 82a via compressor discharge line 108a and to slave tank 82b via compressor discharge line 108b. In some examples, the air compressor 78 can supply air at a mass flow rate in excess of the rate of consumption of air by the air motors 62a and 62b at their maximum speed of operation and at the maximum desired compressor discharge pressure. In that case, as the slave air storage tanks 82a and 82b are being refilled (when their pressures hit the desired low pressure limit $P_{min}$), the rate at which compressed air is added to the slave air storage tanks 82a and 82b by compressor 78 will exceed the rate at which air is consumed by the air motors 62a and 62b so that the amount of air in the master 80a/80b and slave 82a/82b tanks will increase until the slave air storage tank 82a and 82b pressures read the desired upper limit $P_{max}$.

The slave air storage tanks 82a, 82b are maintained at a pressure that varies between a first selected value (the predefined minimum pressure ($P_{min}$)) and a second selected value (the predefined maximum pressure ($P_{max}$)). If air is flowing to the air motors 62a and 62b, the pressure in the master air storage tanks 80a and 80b will be less than the pressure in the slave air storage tanks 82a and 82b. The air pressure in the slave 82a, 82b and master 80a, 80b tanks will be significantly higher than the pressure required at the air motors 62a and 62b because it is desirable to maximize the amount of air with which the master tanks 80a/80b and slave tanks 82a/82b are pre-filled while still regulating the air flow rate to air motors 62a and 62b so that the watercraft 10 speed may be controlled. In order to regulate the air flow rate to the air motors 62a and 62b, the pressure must be reduced significantly from the pressure in storage tanks 80a/80b and 82a/82b. In the first instance, pressure drop valves 84a and 84b drop the air pressure significantly. In addition, however, pressure regulators 86a and 86b (fixed or adjustable valves that drop the air pressure) are provided downstream of the master air storage tanks 80a and 80b. Master air storage tank discharge line 110a is connected to regulator 86a and master air storage tank discharge line 110b is connected to regulator 86b. The regulators 86a and 86b control the inlet air pressure to pneumatic control unit 69. In certain examples, the regulators 86a and 86b control the control unit 69 inlet pressure to from about 80 psig to about 120 psig, preferably from about 90 to about 110 psig, and more preferably from about 95 to about 105 psig. In one specific example, 100 psig is used.

The pneumatic control unit 69 includes compressed air discharge lines 68 and 70. The air pressure supplied to air motors 62a and 62b via discharge lines 68 and 70 is adjustable using throttle 72. Compressed air discharge line 68 is a forward line that is connected, preferably in parallel, to air motor forward rotation inlet port 64a of air motor 62a and air motor forward rotation inlet port 64b of air motor 62b. Compressed air discharge line 70 is a reverse line that is connected, preferably in parallel, to air motor reverse rotation inlet ports 66a and 66b of air motor 62b One or more internal air control valves within control unit 69 adjust the air pressure in discharge lines 68 and 70 based on the throttle 72 position. The throttle 72 includes two levers which can be manipulated to cause the watercraft 10 to go forward and in reverse by causing air to be selectively supplied from forward line 70 or reverse line 68 (i.e., the throttle 72 is operable to adjust the air flow rate and propeller rotational direction). Supplying air to the air motor forward rotation inlet ports 64a and 64b causes gears in air motors 62a and 62b to rotate in a first direction, which in turn causes propellers 52a and 52b to rotate in a first direction about the propeller shaft length axes l, propelling the watercraft 10 forward. Supplying air to air motor reverse rotation air inlet ports 66a and 66b causes gears in air motors 62a and 62b to rotate in a second direction, which in turn causes propellers 52a and 52b to rotate in a second direction about the propeller shaft length axes l, propelling watercraft 10 in reverse. The levers on throttle 72 are manipulable to rotate the propellers 52a and 52b in forward and reverse from a speed of zero to the maximum rate of rotation of the air motors 62a and 62b. In one example, the supply pressure to the air motors 62a and 62b ranges from 0 to 100 psig, which corresponds to a propeller rotational frequency of from 0 to about 400 rpm.

Throttle 72 includes wires 98a and 98b and/or suitable electronic components which send a control signal to the control unit 69 to cause control unit 69 to adjust the controller discharge pressure in lines 68 and 70 via internal air control valves. Thus, the master air storage tanks 80a and 80b are in fluid communication with the air motors 62a and 62b via the pressure regulators 86a and 86b and the air control valves in the control unit 69. In certain examples, the compressed air pressure in compressed air discharge lines 68 and 70 ranges from 0 to about 100 psig.

Control unit 69 is also operatively connected to indicators 74 and 76. Indicators 74 and 76 provide a visual indication of the frequency of rotation of each propeller 52a and 52b (e.g., RPM) based on appropriate instruments connected to the propeller shaft assemblies 46a and 46b or the air motors 62a and 62b. Indicator lines 100a and 100b provide electrical signals necessary to operate the indicators 74 and 76 and are in electrical communication with air motors 62a and 62b or other devices used to indicate the speed of rotation of the shaft assemblies 46a and 46b.

Air compressor 78 (and an auxiliary compressor, if provided) is preferably capable of being powered by battery power. A plurality of batteries 92a, 92b, 94a, and 94b are provided to supply electrical energy necessary to operate air compressor 78. The positive terminals of batteries 92a and 94a are connected to a power distribution panel 88 via electrical connection lines 102a and 102b, respectively, and the negative terminals of batteries 92a and 94a are connected to ground. The positive terminals of batteries 92b and 94b are connected to power distribution panel 88 via electrical connection lines 103a and 103b, and the negative terminals of batteries 92b and 94b are connected to ground. The power distribution panel 88 is connected to a positive terminal of the air compressor 78 electric motor via connection 113a and to a negative terminal of the air compressor 78 electric motor via connection 113b. The power distribution panel 88 selects one from among the four batteries 92a, 94a, 92b, 94b at a time to supply power to compressor 78.

The batteries 92a, 94a, 92b, 94b are preferably rechargeable and are each preferably capable of supplying the energy needed to cyclically operate compressor 78. Suitable examples include lithium iron phosphate batteries. The batteries 92a, 94a, 92b, 94b are preferably selected to provide a voltage compatible with the requirements of the compressor 78 motor and a capacity sufficient to ensure that electric power is sufficient to allow watercraft 10 to remain at sea for a desired period at a desired speed without recharging. In one example, four (4) size 8D lithium iron phosphate batteries supplied by RELi³ON® of Fort Mill, S.C. are used. The batteries 92a, 94a, 92b, 94b are connected to a recharging panel 90 via recharging lines 104a, 104b, 106a, and 106b. Recharging panel 90 is connected to a plug 96 for connecting recharging panel 90 to a dock power source. When watercraft 10 is in port, plug 96 may be connected to a power source to recharge batteries 92a, 94a, 92b, and 94b. As indicated previously, in the case of ship 200, 512 batteries are shown. The particular size, weight, and energy capacity of the batteries may be selected based on the weight of ship 200, the expected cargo load, the desired maximum draft, and the expected electrical load to run the ship's electrical systems as well as based on the expected variations in list and trim that the battery ballast system 211 is expected to encounter. Exemplary masses of individual batteries 292, include masses of at least 40 $lb_m$, at least 60 $lb_m$, and at least 80 $lb_m$, and at the same time masses of not more than 200 $lb_m$., not more than 175 $lb_m$., and not more than 150 $lb_m$.

In certain examples, the kinetic energy of the rotating propeller shaft assemblies 46a and 46b is converted to electrical energy for use by other electrically-powered systems onboard watercraft 10. In one implementation, alternators 58a, 58b, 60a, 60b are connected to each shaft assembly 46a and 46b and convert a portion of the rotating shaft kinetic energy to electrical energy. The electrical current supplied by the alternators 58a, 58b, 60a, 60b is then supplied to the power distribution panel 88. The power distribution panel 88 can then supply the current to recharge accessory batteries used to run lights, horns, radios, etc.

In certain implementations, propulsion system 40 is used to retrofit a watercraft 10, from which an existing fossil fuel engine and fossil fuel tanks have been removed. In certain implementations, the components forming the propulsion system 40 allow watercraft 10 to remain at sea longer than the watercraft 10 with the fossil fuel engine and fuel tanks while weighing significantly less than the removed fossil fuel tanks and engines, fossil fuel, and engine. In certain examples, additional batteries such as batteries 92a, 94a, 92b, and 94b may be installed and used both as ballast and as a source of additional electricity, allowing watercraft 10 to remain at sea even longer. In such cases, each battery 92a, 94a, 92b and 94b is preferably selectively positionable along one or both of a watercraft length axis and a watercraft width axis.

In a preferred example, a large number of batteries 92a, 94a, 92b, and 94b are provided, and each battery serves as one of the ballast batteries 292 in 3A-3B and 4-5. In one example, each battery 92a, 94a, 92, 94b is a standard truck battery. In accordance with the preferred example, the ballast system 211 is designed to selectively electrically connect any number of the batteries 92a, 94a, 92b, and 94b to power distribution panel 88 and a power grid that is operatively connected to compressor 78 and any other battery-powered components so that any combination of batteries 92a, 94a, 92b, and 94b may be used. In such cases, carriage assemblies such as carriage assemblies 214-244 are provided and are designed with conductive pathways so that when any given slot is occupied by a battery 92a, 94a, 92b, 94b, that battery can be selectively connected to the power grid and power distribution panel 88 to provide power to whatever accessories or equipment need battery power.

A method of operating watercraft 10 will now be described. Watercraft 10 is initially docked. Compressed air storage tanks 80a/80b and 82a/82b are filled with air until the slave air storage tanks 82a and 82b reach their desired maximum pressure $P_{max}$. As air motors 62a and 62b are initially off, the master tanks 80a and 80b will be at the same pressure as their respective slave tanks 82a and 82b. In the case of NUVT4500 tanks, the maximum pressure is the service pressure of 4500 psig. At this point, pressure regulators 86a and 86b are set to supply a desired air pressure (e.g., 100 psig) to control unit 69 supply lines 112a and 112b. However, internal valves in control unit 69 are closed and supply no air to the air motors 62a and 62b (e.g. 0 psig). Batteries 92a, 94a, 92b, 94b are fully charged. After unmooring the watercraft 10, throttle 72 is actuated to transmit air pressure via forward rotation line 68 to air motor forward rotation input ports 64a and 64b, with the position of the throttle corresponding to both the pressure in forward rotation line 70 and the rotational frequency of propellers 52a and 52b. Batteries 92a, 92b, 94a, 94b are aligned along the length and width axes of watercraft 10 to provide the desired trim and list at the start of the journey. Fresh water tank 346 also preferably has an amount of water which, when combined with the battery and carriage assembly weights, provides an initial desired amount of total ballast.

After the journey has progressed for a period of time, the air pressure in slave air storage tanks 82a and 82b drops to a first selected value, the desired minimum pressure $P_{min}$. At this point, a controller in the power distribution panel 88 electrically connects one of the batteries 92a, 94a, 92b, 94b to an electric motor that drives compressor 78 and/or activates the electric motor that runs compressor 78. Compressor 78 intakes and compresses ambient air, causing it to flow to the slave air storage tanks 82a and 82b and then into the master air storage tanks 80a and 80b. Alternatively, the regulators 86a and 86b can be configured and/or controlled to allow only one tank pair 80a/82a or 80b/82b to be used at any one time. Once the pressure in the slave air storage tanks 82a and 82b reaches a second selected value, the maximum desired pressure $P_{max}$, the compressor 78 is turned off (such as by discontinuing the supply of electric power from power distribution panel 88). If the pressures in slave air storage tanks 82a and 82b are different, the system may be configured to turn off compressor 78 when either slave tank 82a or 82b reaches the maximum desired pressure $P_{max}$. While the system could be configured to keep the compressor 78 running until both slave tanks 82a, 82b reach $P_{max}$, it is preferred to turn the compressor 78 off when one of them reaches $P_{max}$ to prevent overfilling if one of the pressure sensors or switches fails.

This process of cycling the compressor 78 on and off as the pressure drops and rises in the slave tanks 82a, 82b is repeated. Eventually, the currently operative battery from among batteries 92a, 94a, 92b, 94b drops to a potential difference that is low enough to cause the controller in the power distribution panel 88 to place another one of the batteries 92a, 94a, 92b, 94b in electrical communication with the motor in compressor 78. Moreover, during the entire journey, no fossil fuels are consumed and no carbon dioxide, carbon monoxide, water, NOx, SOx or other pollutants are emitted.

If it is desired to adjust the trim of the watercraft 10, one or more of the batteries 92a, 92b, 94a, 94b may be moved along the length axis of the watercraft 10. If it is desired to adjust the list of the watercraft 10, one or more of the batteries 92a, 92b, 94a, 94b may be moved along the width axis of the watercraft 10. In examples in which the watercraft 10 is a larger ship such as ship 200, additional batteries would be provided in the manner described previously for ballast batteries 292 of FIGS. 3A-3B, 4, and 5. If the overall draft of watercraft 10 needs to be reduced, ballast controller 400 or any of the other techniques previously described may be used to expel potable water overboard via overboard line 411. Conversely, if more draft is required, the flow rate of sea water into the potable water treatment system 340 may be increased by increasing the setpoint of flow controller 353 or using any of the other techniques previously described to increase the level in tank 346.

EXAMPLE 1

A 1972 Luhrs Sport Fishing Boat weighing approximately 19,000 lbs. is provided. The boat includes two Chrysler 318 cc engines. Including the reverse and reduction gears, the engines weigh approximately 900 lbs. each. Two 75 gallon gas tanks are also included, which collectively weigh about 250 lbs. empty. 150 gallons of gasoline weighs approximately 1,100 lbs. Thus, the total weight of the gasoline engines, gas tanks, and gasoline is about 3150 lbs. The boat is retrofitted with a propulsion system in accordance with propulsion system 40 of FIG. 2.

The Chrysler engines, the gas tanks, and the gas are removed from the vessel. Four Nuvair NUVT4500 compressed air storage tanks are installed in the vessel, each of which has an empty weight of about 145.5 lbs.

Two GAST 1UP-NRV-15 rotary air motors are installed as shown in FIG. 2. One commercially available main compressor weighing about 800 lbs. and two commercially available auxiliary compressors weighing about 400 lbs. each are also installed. The compressors are selected to have a maximum discharge pressure of about 4500 psig and to supply a flow rate or air to both air tanks 80a, 82a, 80b, and 82b which exceeds the amount of air consumed by air motors 62a and 62b when watercraft 10 is at a cruising speed of 15-18 miles per hour. The weight of each motor 62a and 62b is approximately 25 lbs. Twelve RELi$^3$ON® lithium iron phosphate 12V, size 8D batteries weighing approximately 83 lbs each are installed. The boat has an existing control panel and power distribution panel which are rewired and outfitted with pneumatic lines for use with air motors.

The retrofitted components weigh about 220 lbs more than the removed components. However, prior to retrofitting, when watercraft 10 is cruising at a speed of about 15-18 miles per hour, it consumes about 7 gallons of gasoline per hour, which will exhaust the full 150 gallon fuel supply in about 21.4 hours. In contrast, each of the 12 lithium iron phosphate batteries is estimated to be able to run the main and auxiliary compressors for 72 hours continuously, even though in operation, the compressors will only be run periodically (i.e., when the slave tank 82a, 82b pressures fall below $P_{min}$). With 12 lithium iron phosphate batteries of the type described above, even if the main and auxiliary compressors were operating continuously, the air motors could be operated continuously for about 36 days (874 hours) while moving watercraft 10 at a speed of about 15-18 miles per hour through the water. Thus, air propulsion systems in accordance with the present disclosure provide the ability to stay at sea for more than 30 times as long as a fossil fuel engine and fuel system sized for the same watercraft.

If only one of the twelve (12) lithium iron phosphate batteries were used, watercraft 10 could still remain at sea more than three times as long with the air propulsion system of the present disclosure than with the replaced fossil fuel system and the retrofitted watercraft 10 would weigh over 650 lbs. less than the original watercraft. Thus, it has surprisingly been discovered that not only can air propulsion systems built in accordance with the present disclosure avoid the burning of fossil fuels, but they can allow the watercraft to remain at sea far longer than fossil fuel engines.

It has also been discovered that adding lithium iron phosphate batteries also helps maintain the list and trim of the watercraft 10. In accordance with this example, the lithium iron phosphate batteries are selectively positionable along the length and width axes of boat, preferably using a carriage system similar in design and smaller in size to ballast system 211 of FIGS. 3A-B, 4 and 5. If the watercraft 10 shows a positive trim by stern (FIG. 1), one or more of the 12 lithium iron phosphate batteries would be moved along the watercraft's length axis toward the bow to reduce the trim by stern. Conversely, if the watercraft 10 shows a negative trim by stern, one or more of the lithium iron batteries would be moved along the length axis toward the stern to increase the trim by stern.

Referring to FIG. 2B, in the case of a list angle that is positive in the clockwise direction when viewing the stern of watercraft 10 in a direction toward the bow of watercraft 10, one or more of the lithium iron phosphate batteries would be moved along the width axis of the watercraft 10 toward the port side of the watercraft 10. Conversely, if the watercraft 10 has a negative list angle in the clockwise direction when viewing the stern of watercraft 10 in a direction toward the bow, one or more of the lithium iron phosphate batteries would be moved along the watercraft 10 width axis toward the starboard side of the watercraft 10.

EXAMPLE 2

An example of a large ship having a 112 foot beam with a battery ballast system like battery ballast system 211 of FIGS. 3A-3B will now be provided. 100 carriage assemblies similar to carriage assemblies 214-244 are provided and located in the lower deck 210. Each carriage assembly has eight (8) tiers arranged along the ship's height axis H. Each battery support in each carriage assembly (e.g., battery support 271) has a length along the ship's length axis of 4 feet, a width along the ship's width axis of two (2) feet, and is spaced apart from is vertically adjacent neighbors by two (2) feet. 100 feet of the ship's 112 foot width is available for carriage assemblies. Thus, there are 100/2=50 slots (e.g., H(1)-H(50)) comprising each tier of each carriage assembly. Each tier has 32 batteries and battery supports occupying 32 of the 50 slots. Each battery weighs 150 pounds, and the average weight per slot (accounting for the fact that 18 slots do not have a battery support 271 in them) is 20 pounds. Thus, the battery weight per tier of each carriage assembly is 150 lbs.×32 batteries/tier=49,800 lbs./tier. The slot weight per tier (without batteries) is 20 lbs./slot×50 slots/tier=1,000 lbs./tier. Thus, the weight of each tier including batteries is 50,800 lbs. or 25.4 tons.

Each carriage assembly has eight (8) tiers, bringing the total weight per carriage assembly to 8 tiers/carriage assembly (25.4 tons/tier)=203.2 tons/carriage assembly. The total weight of the entire battery ballast system is then 100 carriage assemblies×203.2 tons/carriage assembly=20,320 tons. A potable water system is also provided and includes a fresh water tank having a rectangular prism shape with a length of 200 feet and a cross-section of 50 feet by 14 feet, yielding a volume of 145,600 cu. ft. The weight of potable water for such a tank is 145,600 cu. ft.×62.4 lbs./cu. ft.=4542 tons.

In certain examples, the potable water tank is designed to provide an amount of ballast water capacity beyond that which is needed to satisfy the expected maximum consumption of potable water on the ship. As explained previously, the battery ballast can be used to adjust the ship's list and trim, but batteries cannot be selectively added or expelled from a ship at sea. In one example, the potable water tank is sized to hold the maximum required volume of potable water required for shipboard consumption over a specified period of time and to ensure that the ship's waterline does not vary by more than a desired amount when the cargo loading varies between the minimum and maximum expected load. Based on known relationships between the gravitational force on the ship (i.e., the weight expressed as a force), the buoyancy force exerted by the body of water, and the maximum desired variation in the waterline, a maximum allowable change in the ship's mass can be calculated. This variation will correspond to a maximum change in the mass and volume of ballast water held in the potable water tank and the cargo weight. If it is desired for the ship to handle greater swings in cargo mass while staying within the maximum desired waterline variation, additional potable water tank capacity may be provided so that the mass of the potable water allocated to ballast is adjusted accordingly. For example, if the ship's maximum waterline variation is 20 feet, a corresponding change in total ship mass may be calculated which corresponds to that water-line variation. That maximum weight variation may be allocated as follows:

$$\Delta M_T = \Delta M_C + \Delta M_B \quad (7)$$

wherein, $\Delta M_T$=Total change in ship mass corresponding to maximum allowable waterline height variation ($lb_m$ or kg)

$\Delta M_C$=maximum expected variation in cargo mass ($lb_m$ or kg); and $\Delta M_B$=maximum variation in mass of ballast ($lb_m$ or kg).

Because the mass of the battery ballast will not change at sea, $\Delta M_B$ may be used to calculate the incremental potable tank volume required to accommodate the maximum desired cargo and waterline variations using equation (3), above.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A watercraft, comprising:
   a hull;
   a propeller operable to propel the watercraft through a body of water;
   an air motor operative to rotate the propeller; and
   an air compressor operable to supply compressed air to the air motor, wherein the watercraft does not include a fossil fuel engine or a fossil fuel tanks; and
   ballast comprising a plurality of batteries, wherein the batteries in the plurality of batteries are selectively positionable along at least one of a watercraft length axis and along a watercraft width axis.

2. The watercraft of claim 1, further comprising:
a battery ballast system comprising a carriage system and the plurality of batteries, wherein the carriage system comprises a plurality of carriage assemblies, each carriage assembly comprises a plurality of tiers, each tier comprises a pair of tracks, the carriage system further comprising a plurality of battery supports, each battery support engaging a corresponding one of the pairs of tracks and being movable along its corresponding one of the pairs of tracks.

3. The watercraft of claim 2, wherein the carriage assemblies are moveable along the watercraft length axis relative to the hull.

4. The watercraft according to claim 3, wherein the battery supports are movable along the watercraft width axis relative to the hull.

5. The watercraft of claim 3, wherein the watercraft has a bow and a stern, and at least a portion of the carriage assemblies is movable along the watercraft length axis from a first position between the bow and a location midship along the watercraft length axis to a second position between the stern and the location midship along the watercraft length axis.

6. The watercraft of claim 2, wherein the each tier has a set of batteries and at least some of the batteries in at least one tier are movable from a first location between a port side of the ship and a location midship along the watercraft width axis to a second location between a starboard side of the ship and the location midship along the watercraft width axis.

7. The watercraft in accordance with any of claims 2, wherein each tier comprises a plurality of slots sized to accommodate a battery support and no more than one half of the slots in each tier are occupied by battery supports.

8. The watercraft of claim 1, wherein each battery in the plurality of batteries is electrically connected to a watercraft power grid.

9. The watercraft of claim 1, wherein the watercraft has a dead weight tonnage, and the batteries have a total weight that is about 20-30% of the watercraft dead weight tonnage.

10. The watercraft of claim 1, further comprising a potable water system comprising a condenser, an evaporator, an untreated water inlet and a treated water tank, wherein the watercraft does not include a ballast water tank that is not fluidly coupled to a potable water supply system.

11. The watercraft of claim 2, further comprising a control system operatively connected to the carriage system and each battery support and operable to adjust the position of each carriage assembly along the watercraft length axis and the position of each battery support along the watercraft width axis.

12. A method of adjusting the list of a watercraft having hull and having a port side and a starboard side defining a width axis, the method comprising:
providing a battery ballast system comprising a plurality of batteries that are movable relative to the hull along the width axis;
selectively moving a subset of the plurality of batteries along the width axis relative to the hull, wherein the watercraft comprises a propeller operable to propel the watercraft through a body of water, an air motor operative to rotate the propeller, an air storage tank in selective fluid communication with the air motor, and an air compressor operable to selectively supply compressed air to the air storage tank.

13. The method of claim 12, further comprising selectively energizing the air compressor with at least one battery from among the plurality of batteries.

14. The method of claim 12, wherein the watercraft does not include a fossil fuel engine or a fossil fuel tank.

15. The method of claim 12, wherein the watercraft does not include a ballast water tank that is not fluidly coupled to a potable water system.

16. The method of claim 12, wherein the step of selectively moving a subset of the plurality of batteries along the width axis comprises selectively moving a subset of the plurality of batteries from a first position nearer the port side to a second position nearer the starboard side.

\* \* \* \* \*